US012746748B2

(12) United States Patent
Kida et al.

(10) Patent No.: US 12,746,748 B2
(45) Date of Patent: Sep. 29, 2026

(54) LIQUID DISCHARGE APPARATUS, COATING APPARATUS, LIQUID DISCHARGE METHOD, AND METHOD OF MANUFACTURING ELECTRODE

(71) Applicants: Hitoshi Kida, Kanagawa (JP); Hiromichi Kuriyama, Kanagawa (JP); Satoshi Nakajima, Tokyo (JP); Toru Ushirogochi, Kanagawa (JP)

(72) Inventors: Hitoshi Kida, Kanagawa (JP); Hiromichi Kuriyama, Kanagawa (JP); Satoshi Nakajima, Tokyo (JP); Toru Ushirogochi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 187 days.

(21) Appl. No.: 18/682,943

(22) PCT Filed: Aug. 29, 2022

(86) PCT No.: PCT/JP2022/032372
§ 371 (c)(1),
(2) Date: Feb. 12, 2024

(87) PCT Pub. No.: WO2023/032898
PCT Pub. Date: Mar. 9, 2023

(65) Prior Publication Data

US 2024/0343037 A1 Oct. 17, 2024

(30) Foreign Application Priority Data

Aug. 31, 2021 (JP) ................................ 2021-141829
Jun. 6, 2022 (JP) ................................ 2022-091905

(51) Int. Cl.
*B41J 2/045* (2006.01)
*B41J 2/14* (2006.01)
(Continued)

(52) U.S. Cl.
CPC ......... *B41J 2/04581* (2013.01); *B41J 2/0457* (2013.01); *B41J 2/04588* (2013.01);
(Continued)

(58) Field of Classification Search
CPC .................................................... B41J 2202/05
See application file for complete search history.

(56) References Cited

U.S. PATENT DOCUMENTS

2004/0263549 A1 12/2004 Sekiya et al.
2005/0243112 A1 11/2005 Kobayashi et al.
(Continued)

FOREIGN PATENT DOCUMENTS

JP 2001314092 A 11/2001
JP 2005-014367 1/2005
(Continued)

OTHER PUBLICATIONS

International Search Report for PCT/JP2022/032372 mailed on Nov. 10, 2022, 3 pages.
(Continued)

*Primary Examiner* — Shelby L Fidler
(74) *Attorney, Agent, or Firm* — XSENSUS LLP

(57) ABSTRACT

A liquid discharge apparatus includes a liquid chamber including a discharge orifice; a supplying unit configured to supply a pressurized liquid to the liquid chamber; a first valve member provided in the liquid chamber and including a valve portion configured to open and close the discharge orifice; a moving unit configured to move the first valve member; and a stirring mechanism configured to stir the pressurized liquid in the liquid chamber.

19 Claims, 22 Drawing Sheets

(51) Int. Cl.
*B41J 2/175* (2006.01)
*B41J 3/413* (2006.01)

(52) U.S. Cl.
CPC ....... *B41J 2/14201* (2013.01); *B41J 2/17596* (2013.01); *B41J 3/413* (2013.01); *B41J 2202/05* (2013.01)

(56) References Cited

U.S. PATENT DOCUMENTS

| | | | | |
|---|---|---|---|---|
| 2009/0167818 | A1 | 7/2009 | Morita | |
| 2012/0268511 | A1* | 10/2012 | Sasagawa | B41J 2/04581 347/10 |
| 2013/0083106 | A1 | 4/2013 | Tsukamoto | |
| 2015/0274371 | A1* | 10/2015 | Fliess | B65D 25/42 222/1 |
| 2016/0176187 | A1* | 6/2016 | Guidotti | B41J 2/04588 347/10 |
| 2018/0086094 | A1 | 3/2018 | Sakai et al. | |
| 2020/0039217 | A1 | 2/2020 | Kaiba et al. | |
| 2020/0198329 | A1 | 6/2020 | Sugai | |
| 2020/0230953 | A1* | 7/2020 | Martensson | B41J 2/04575 |
| 2021/0159480 | A1 | 5/2021 | Nakajima et al. | |
| 2021/0234171 | A1 | 7/2021 | Sagisaka et al. | |

FOREIGN PATENT DOCUMENTS

| | | |
|---|---|---|
| JP | 4123897 | 7/2008 |
| JP | 2012096193 A | 5/2012 |
| JP | 5410490 | 2/2014 |
| JP | 2018051478 A | 4/2018 |
| JP | 2020-023177 | 2/2020 |

OTHER PUBLICATIONS

Notice of Rejection of Japanese Patent Application No. JP2022-091905 issued Jun. 23, 2026 (9 pages; with English translation).

* cited by examiner

[Fig. 1]
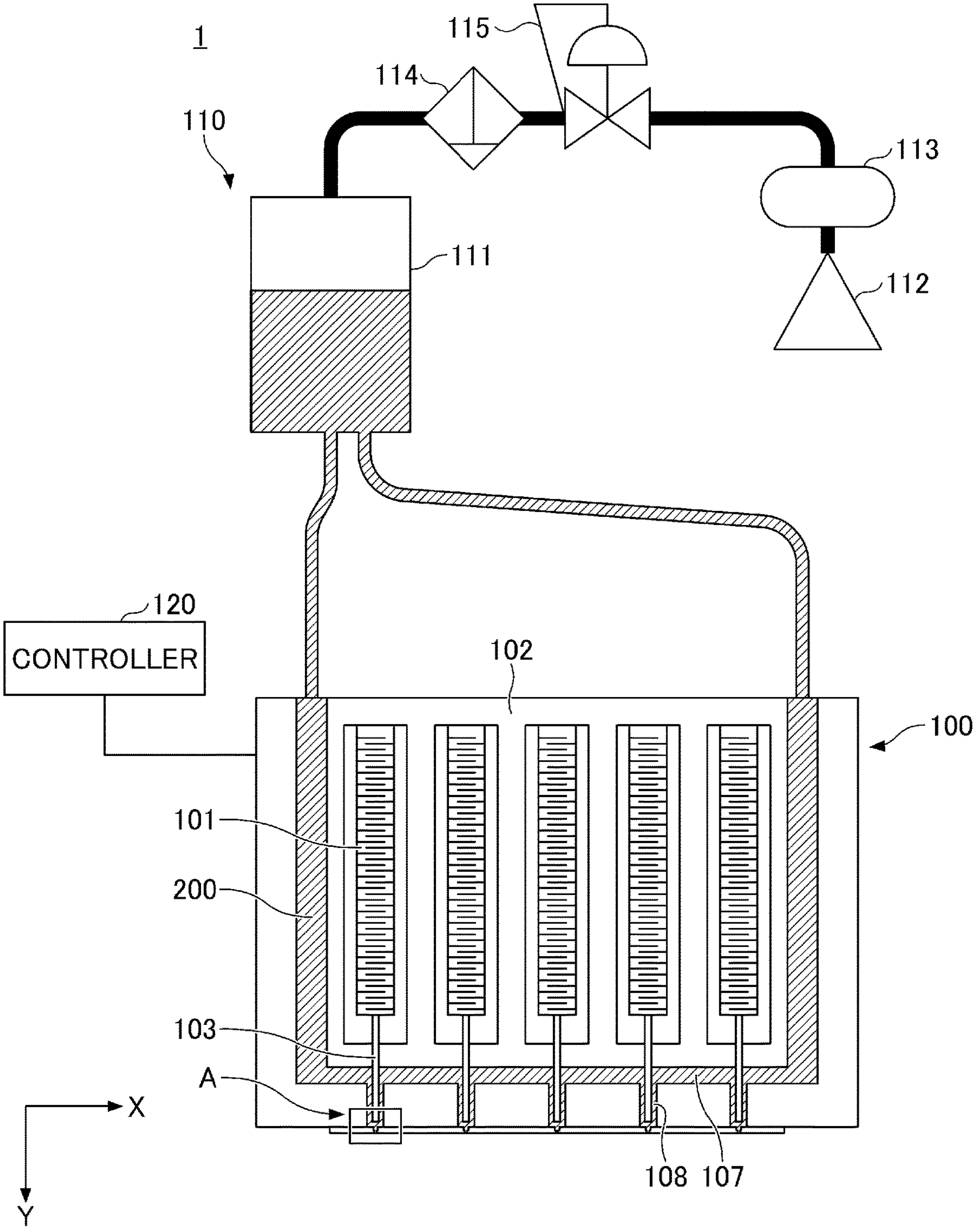

[Fig. 2]
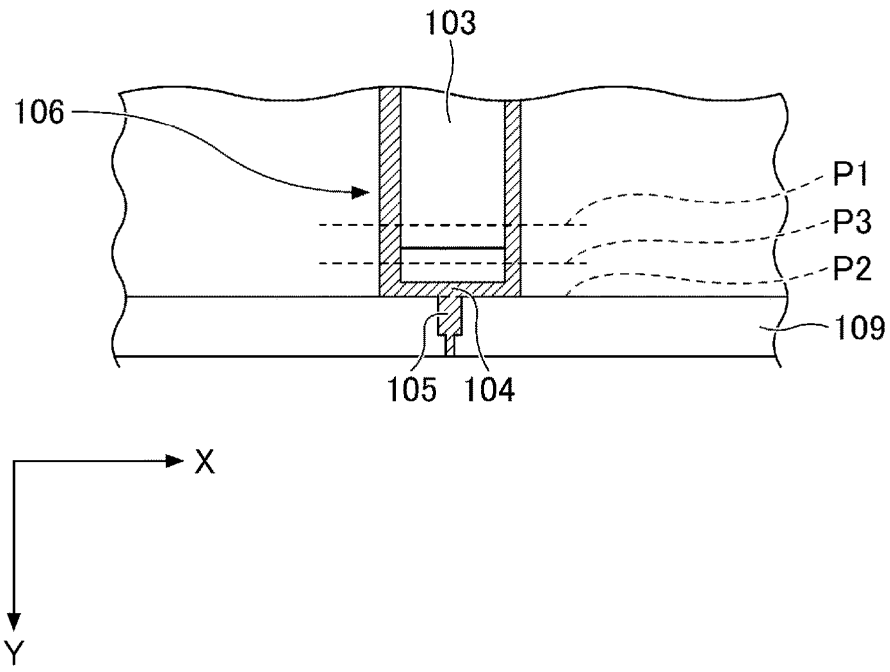
[Fig. 3]
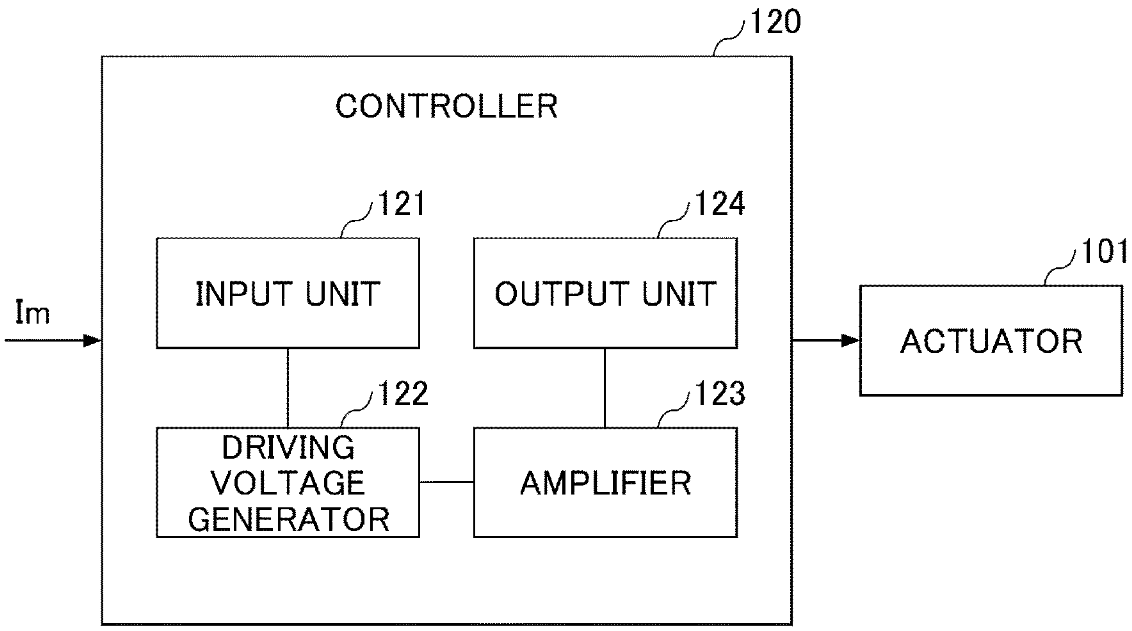

[Fig. 4]
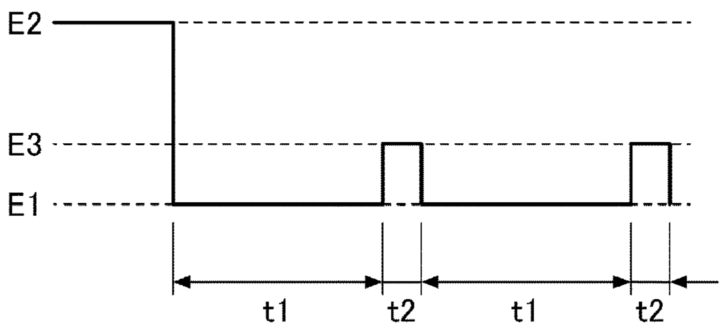
[Fig. 5]
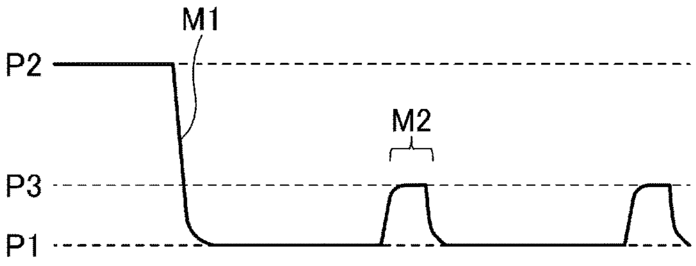
[Fig. 6]
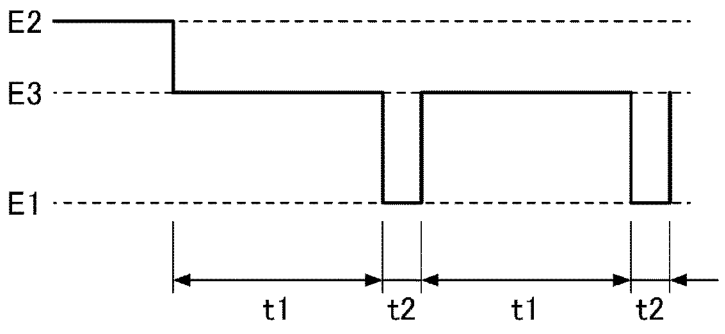
[Fig. 7]
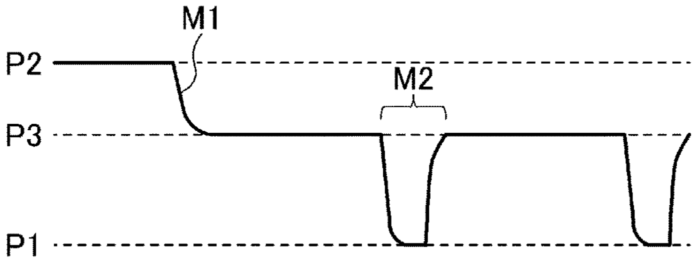

[Fig. 8]
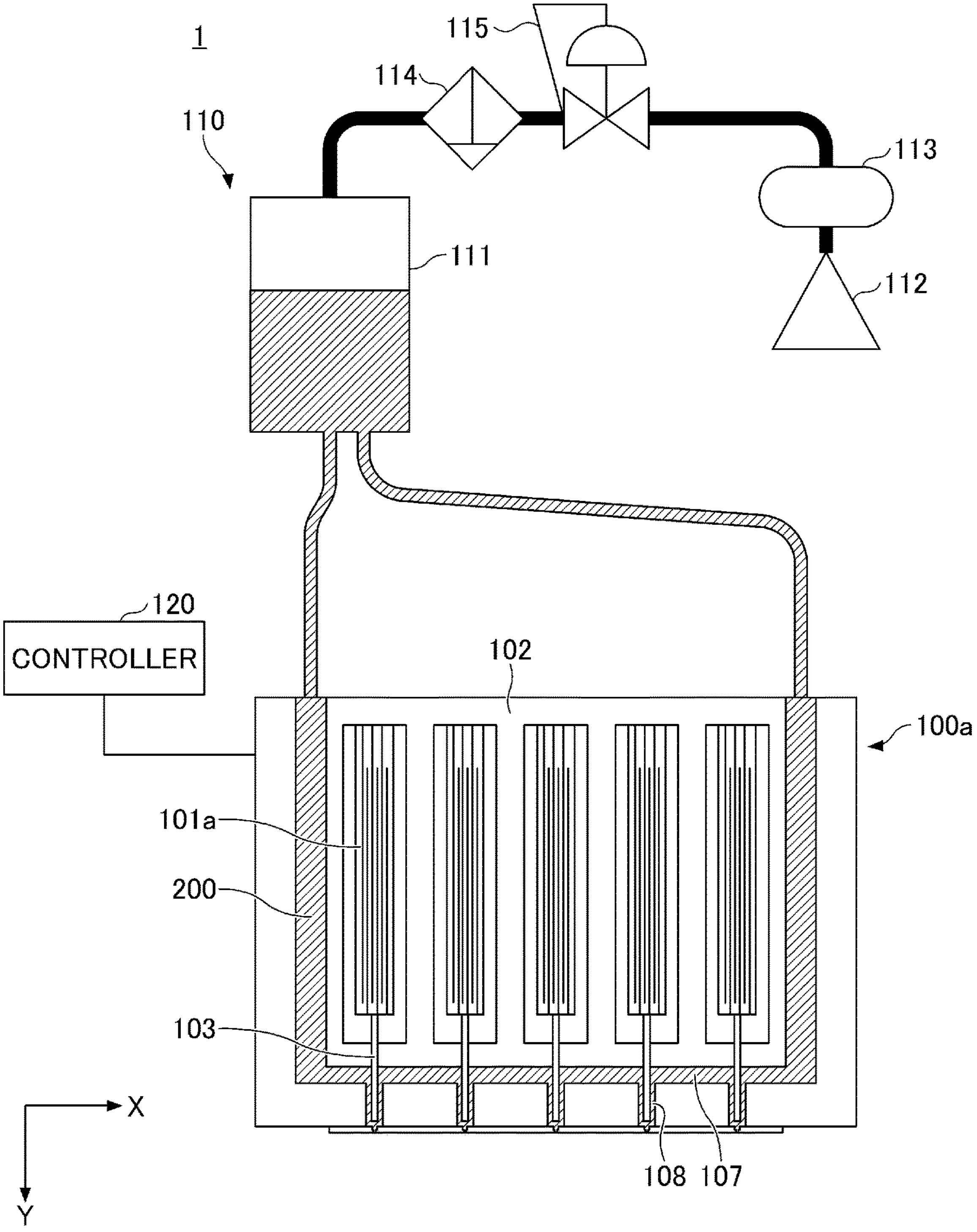

[Fig. 9]
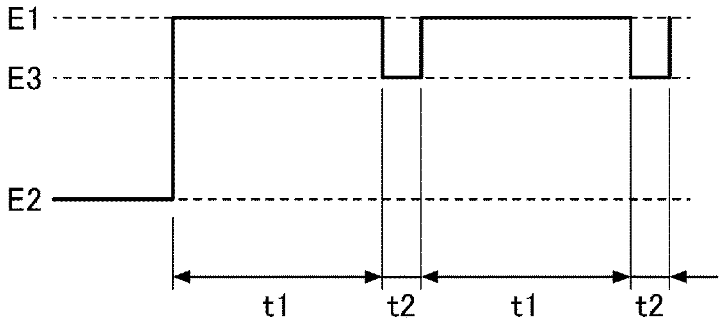
[Fig. 10]
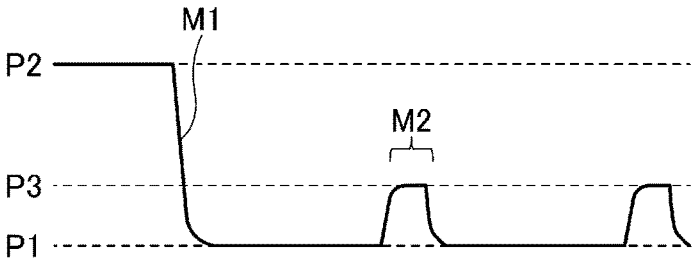
[Fig. 11]
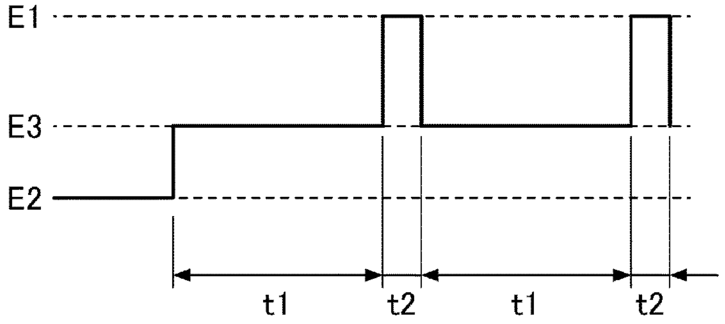
[Fig. 12]
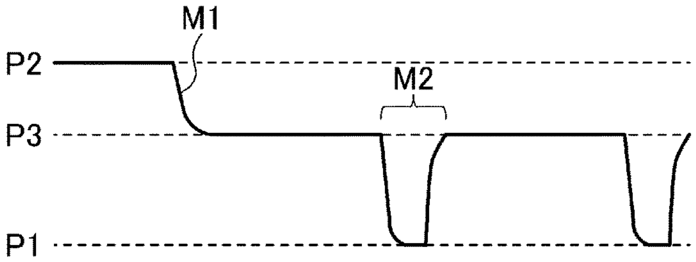

[Fig. 13]
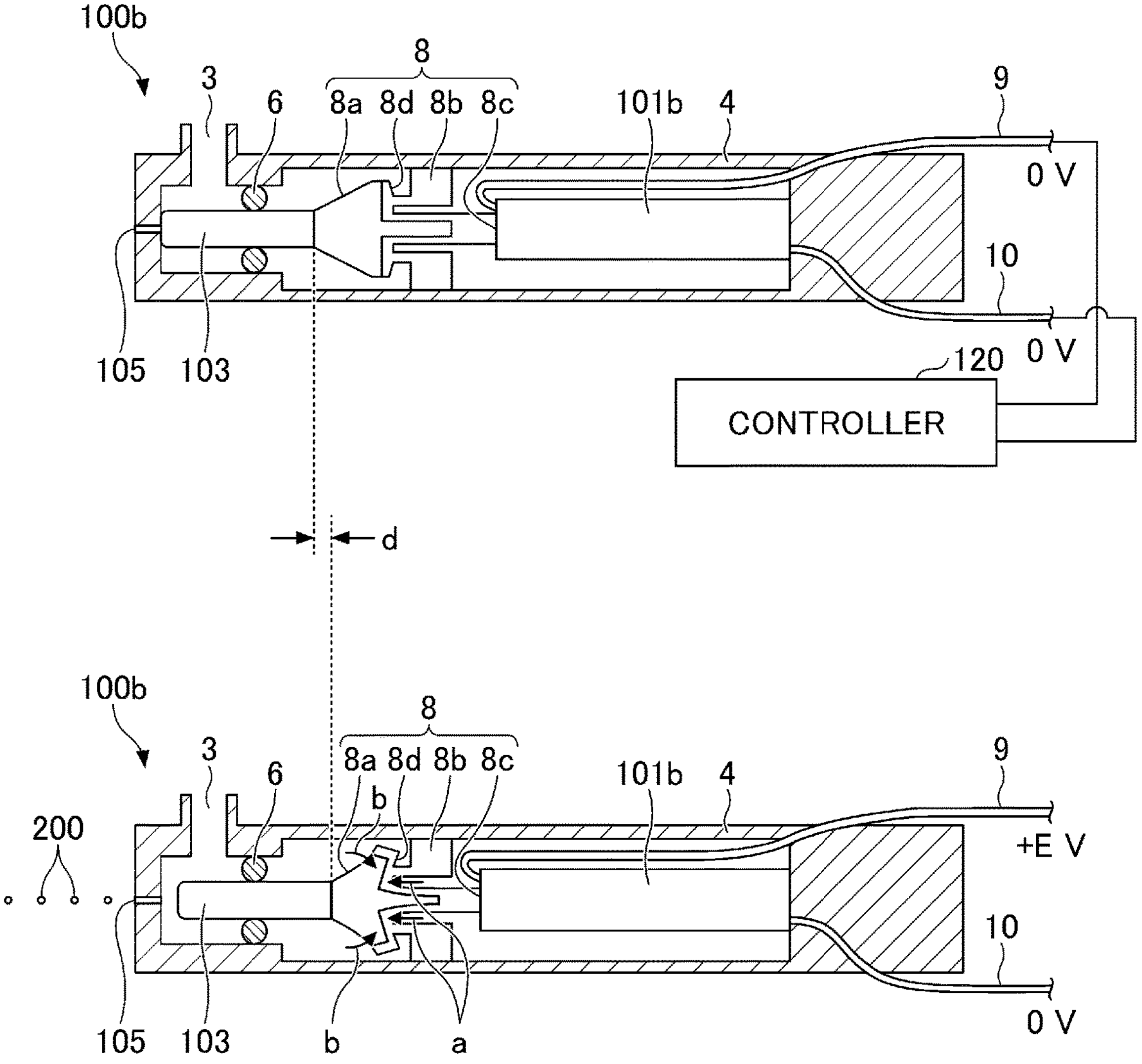

[Fig. 14]
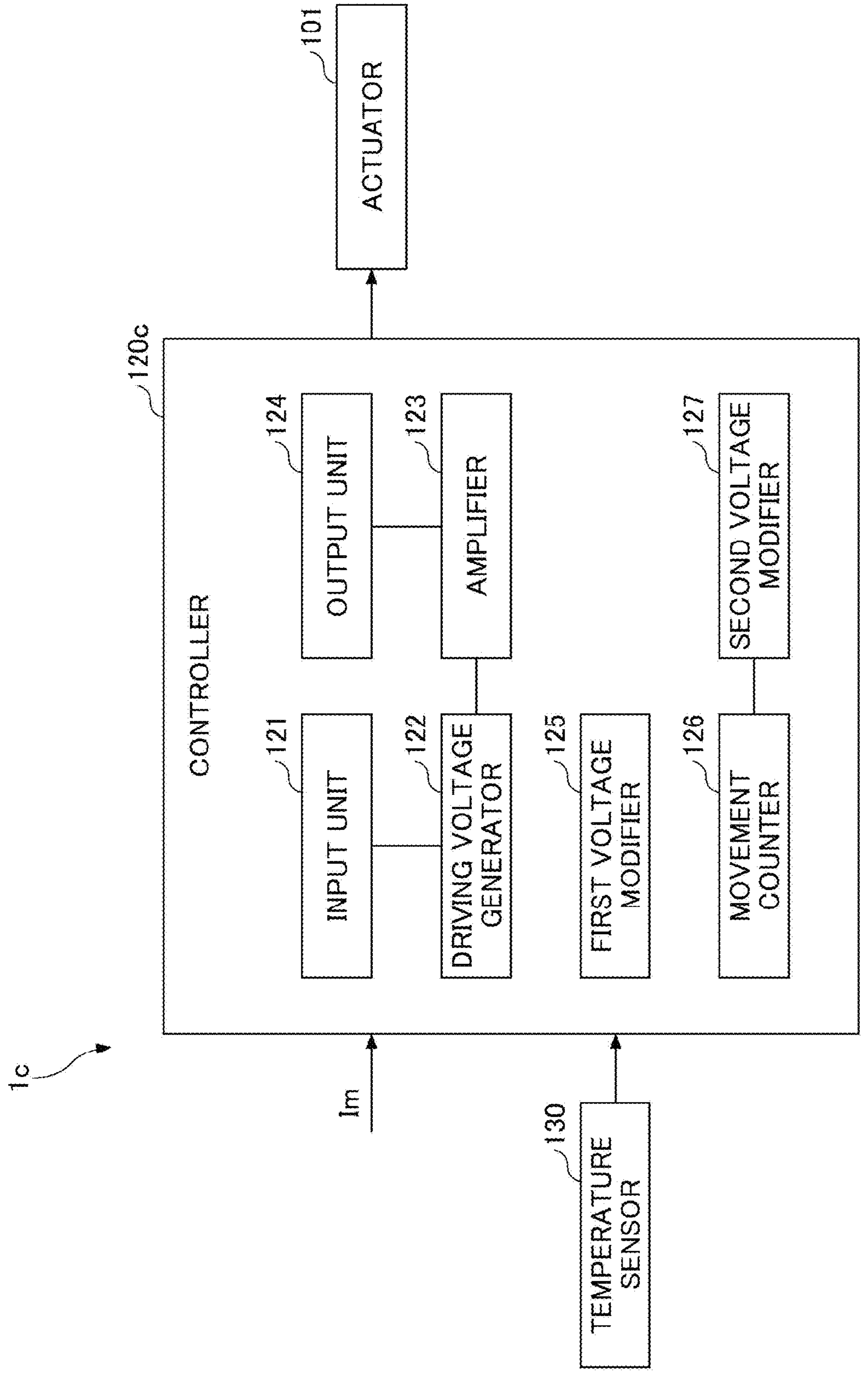

[Fig. 15]
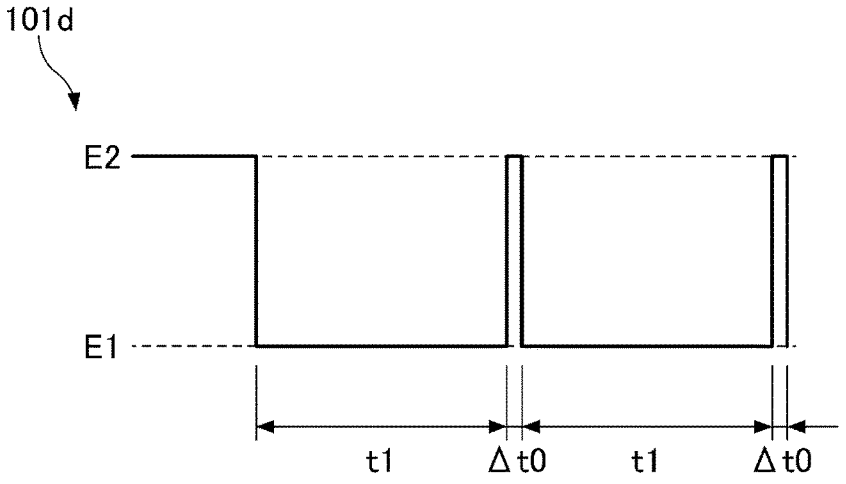
[Fig. 16]
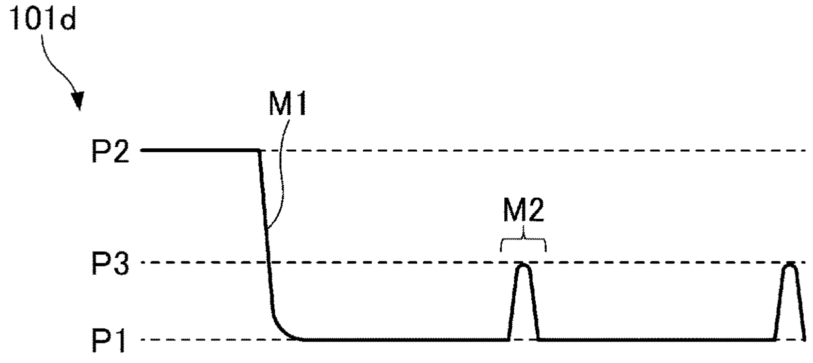
[Fig. 17]
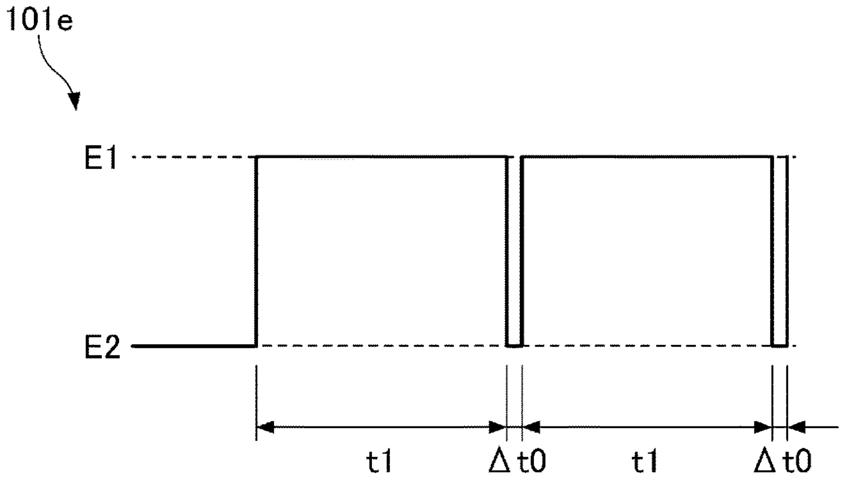

[Fig. 18]
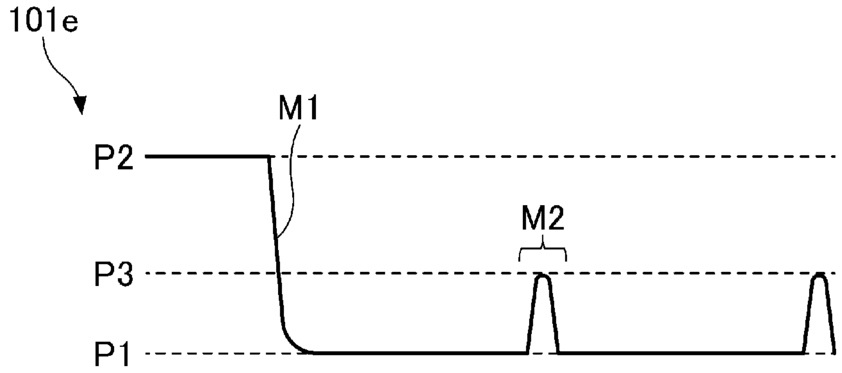

[Fig. 19]
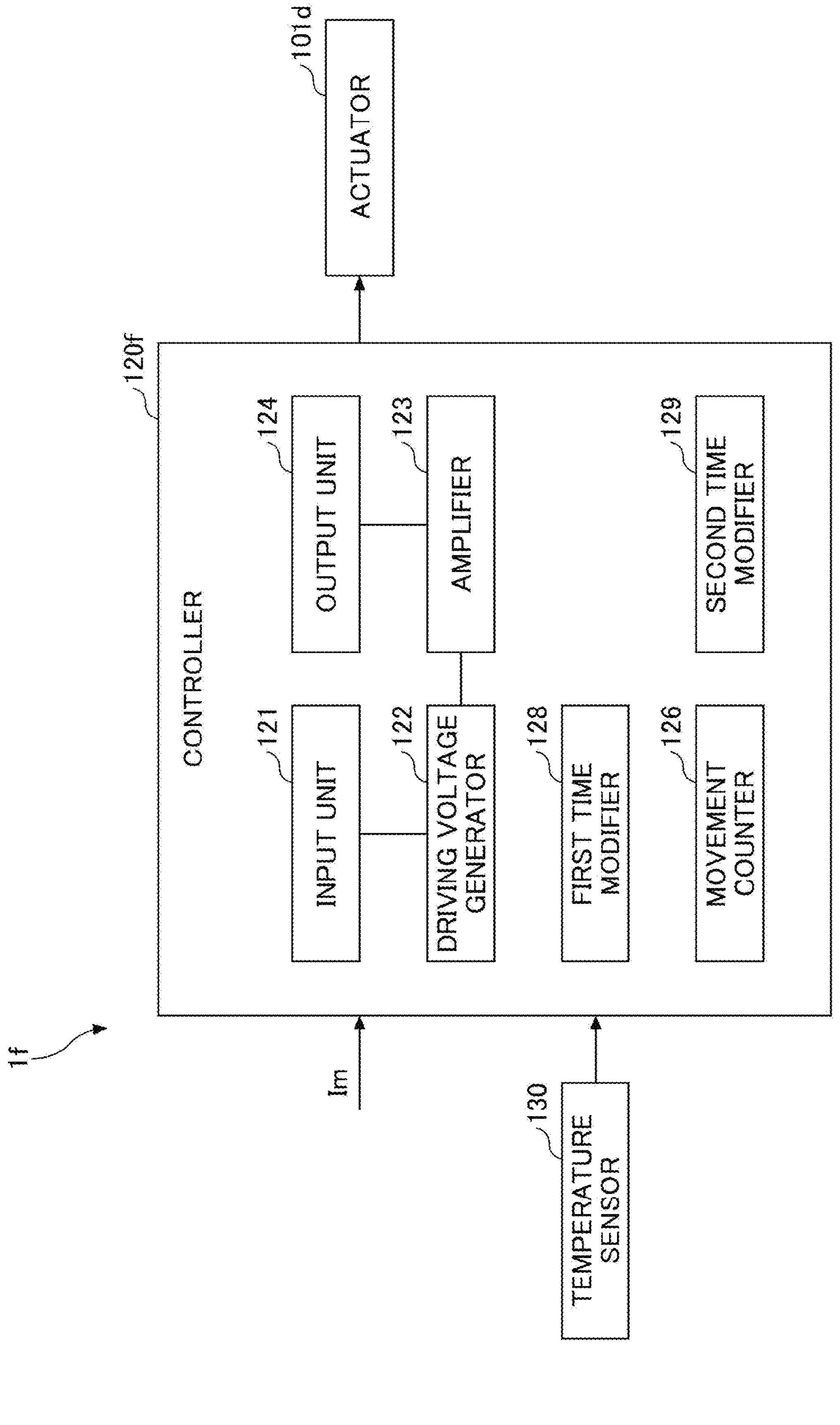

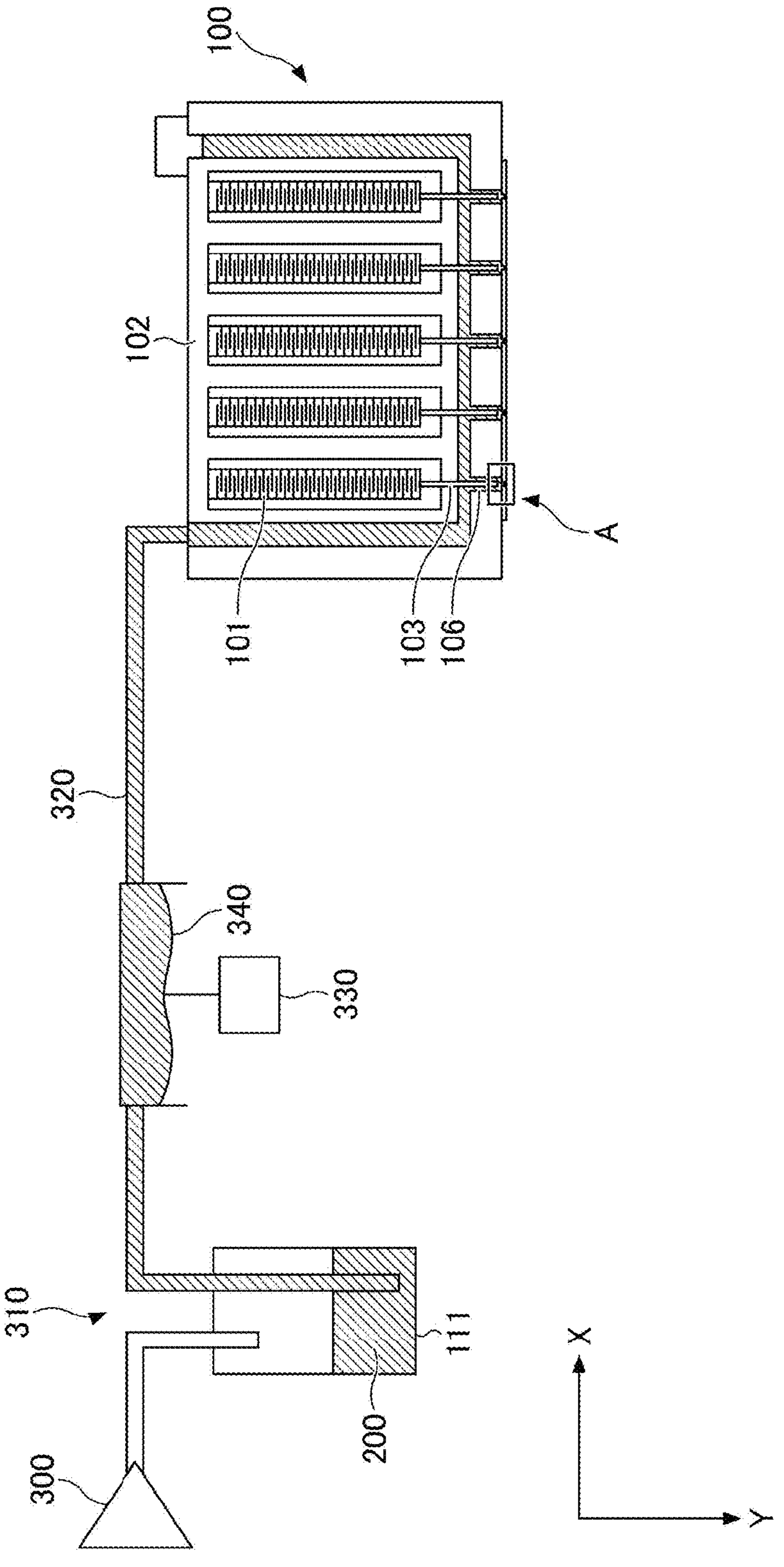
[Fig. 20]

[Fig. 21]
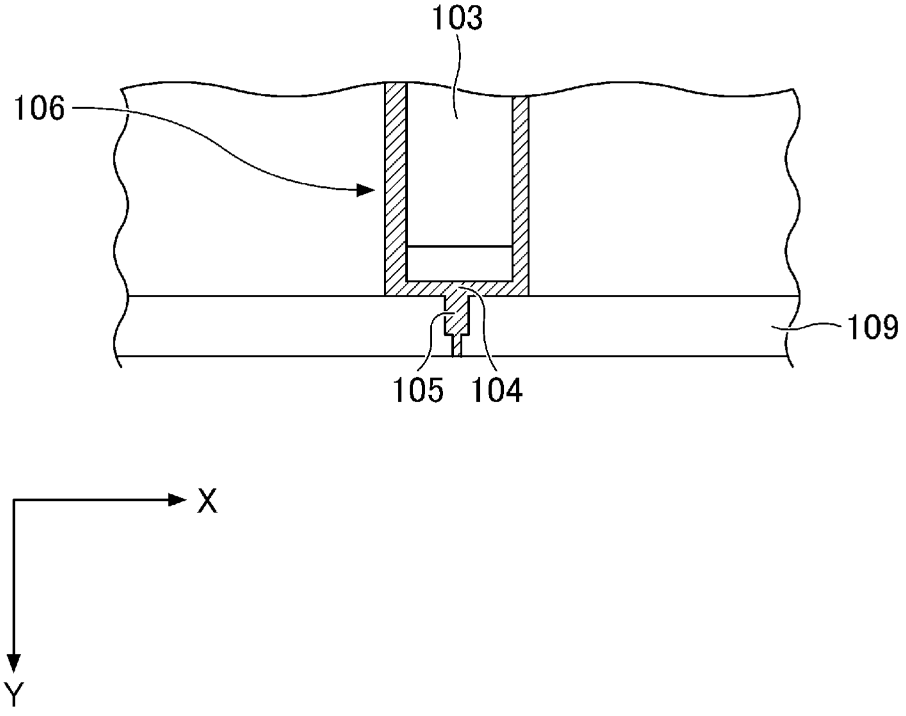

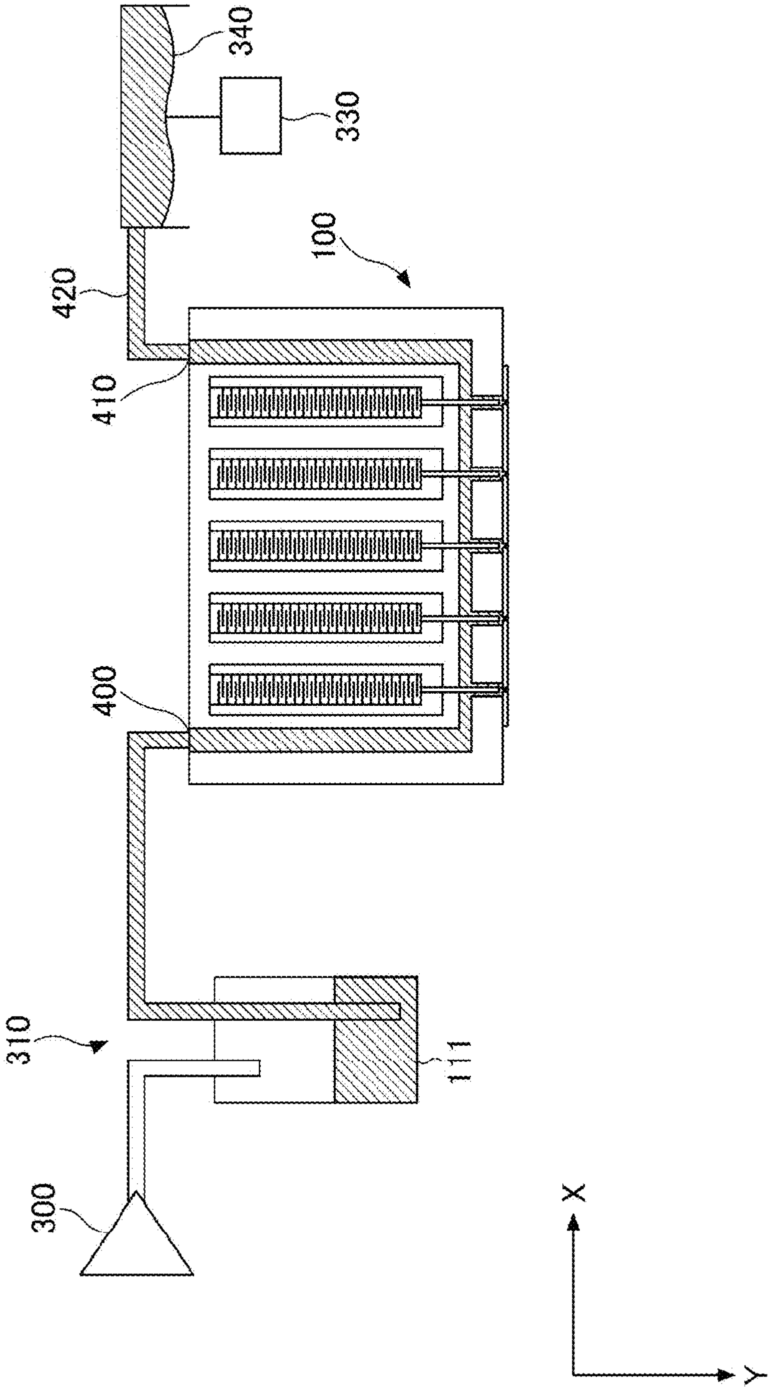
[Fig. 22]

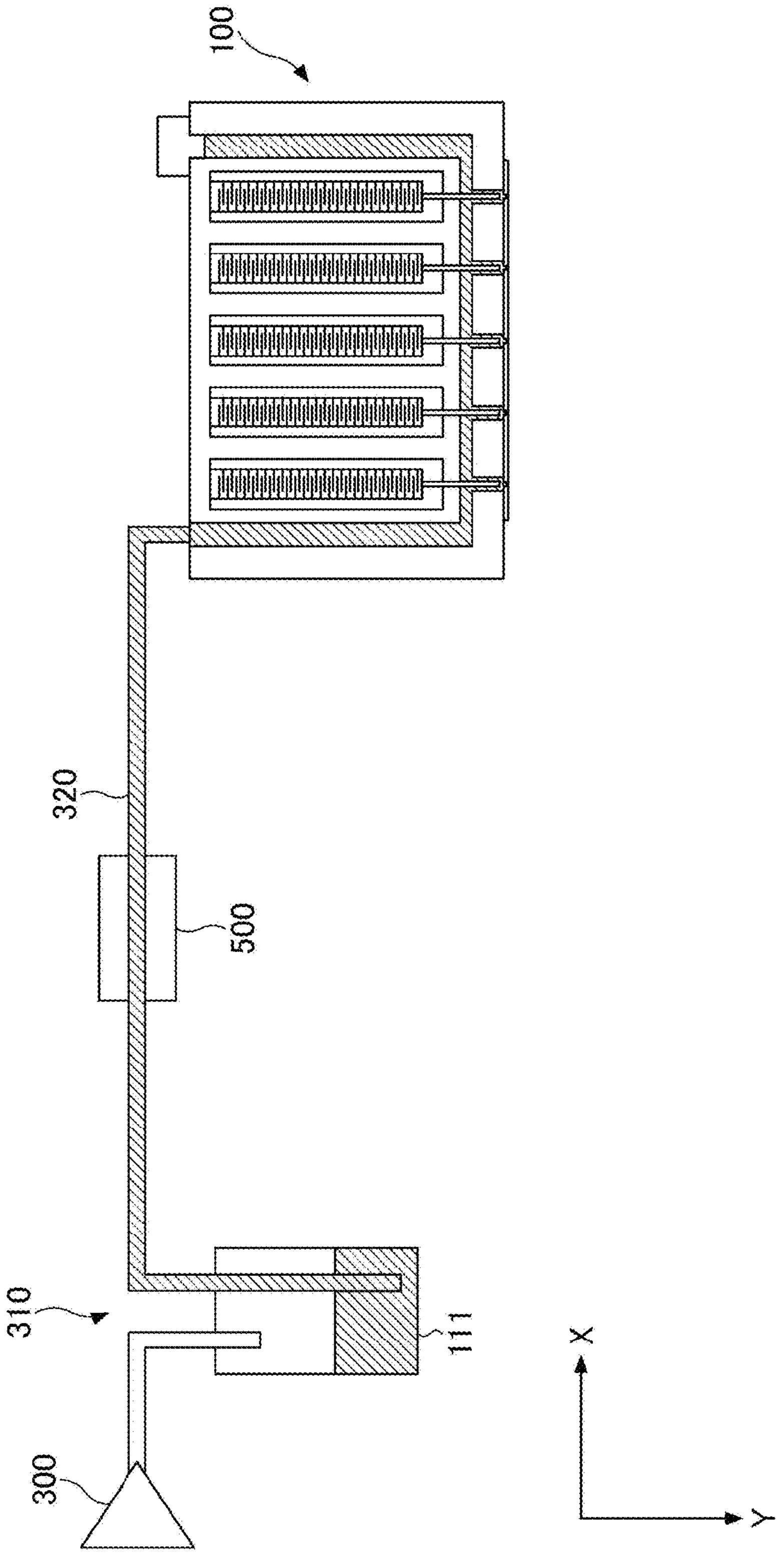
[Fig. 23]

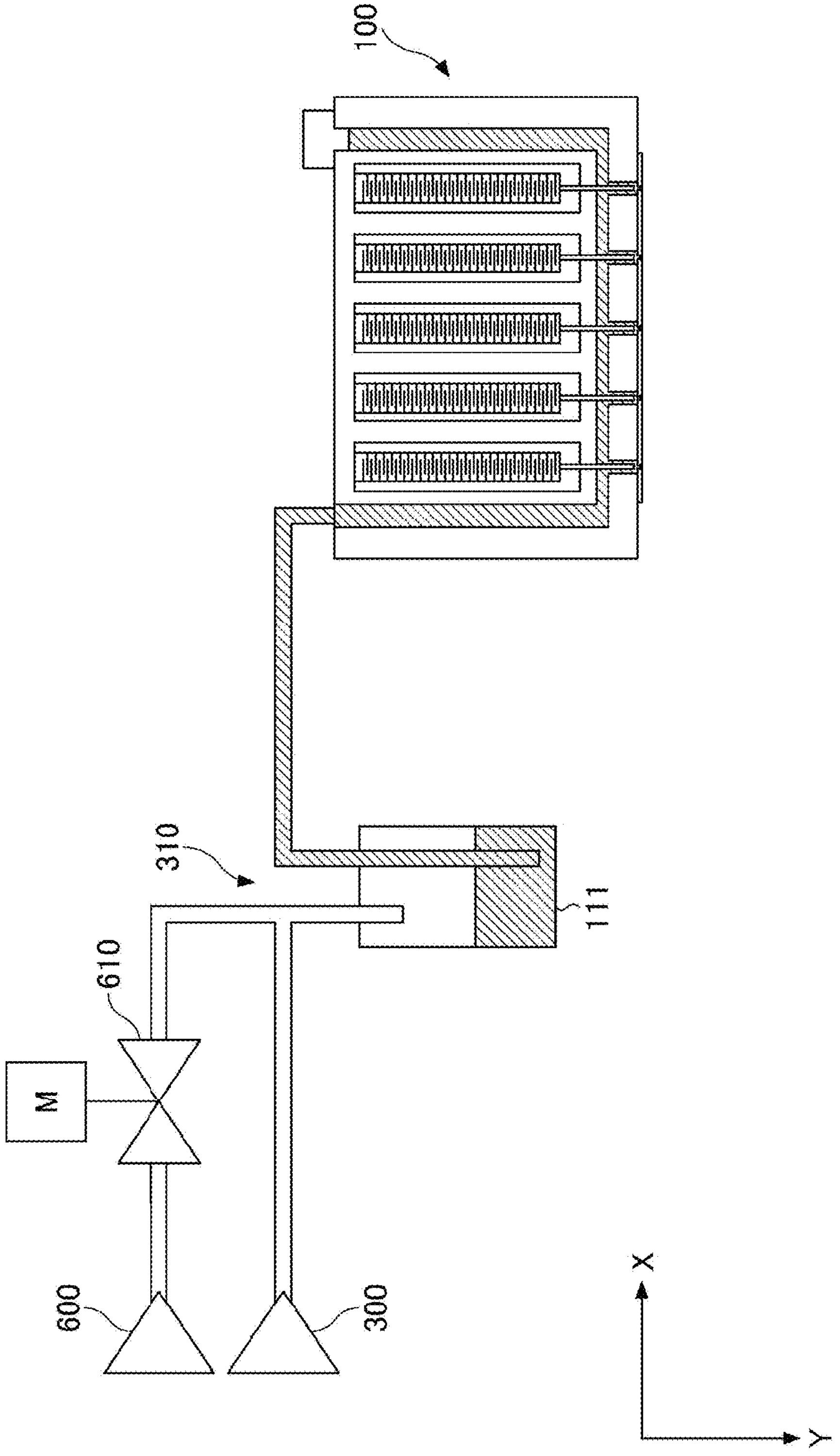
[Fig. 24]

[Fig. 25]
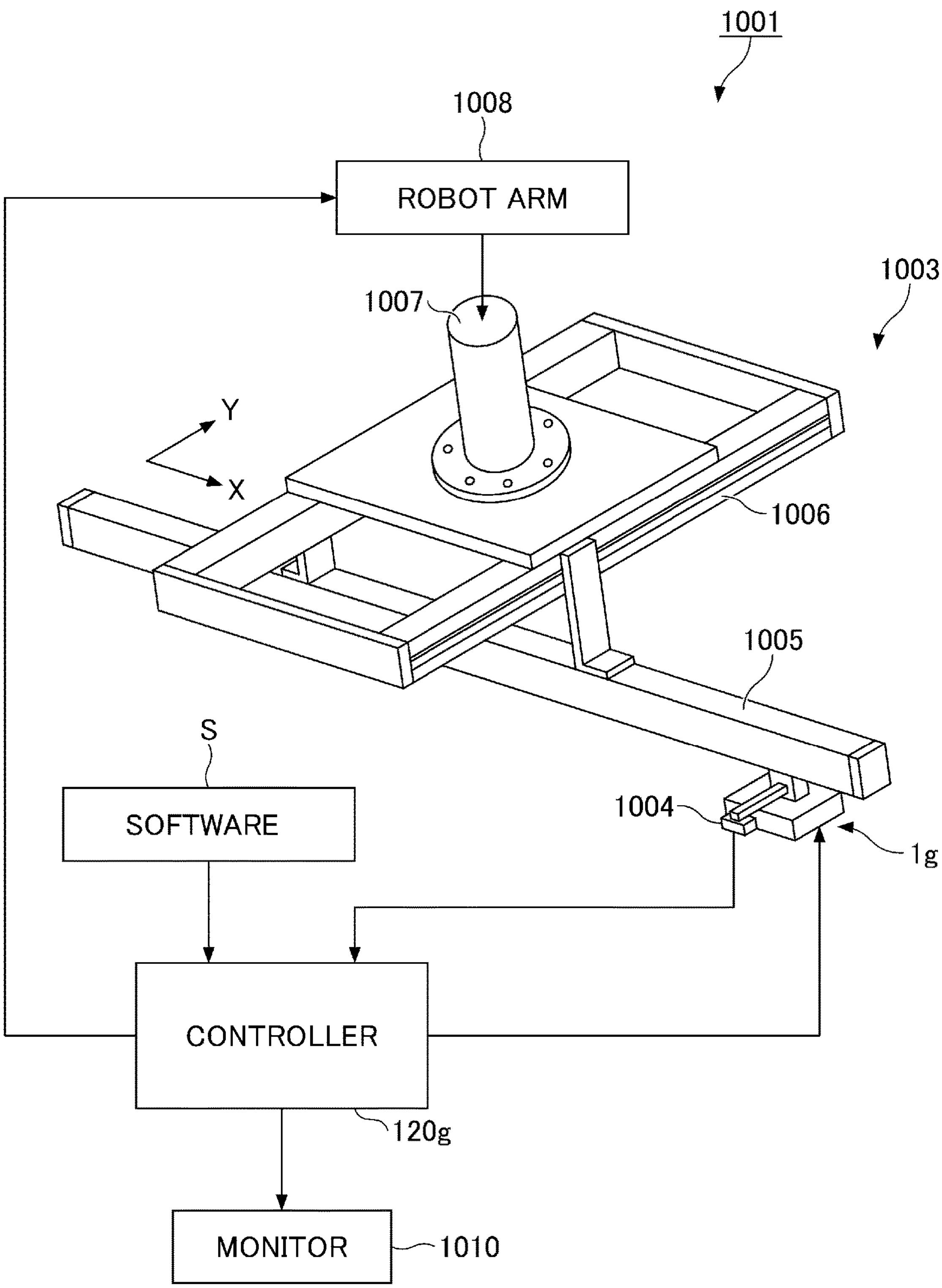

[Fig. 26]
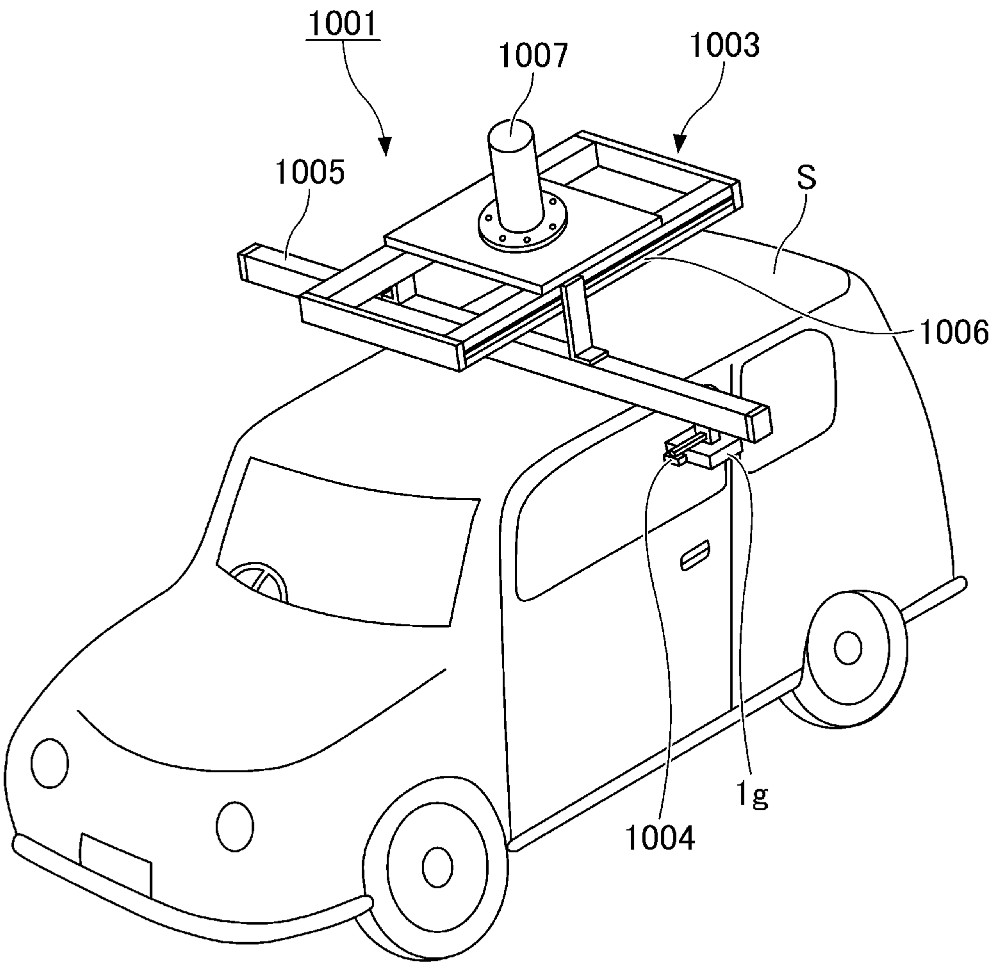

[Fig. 27]
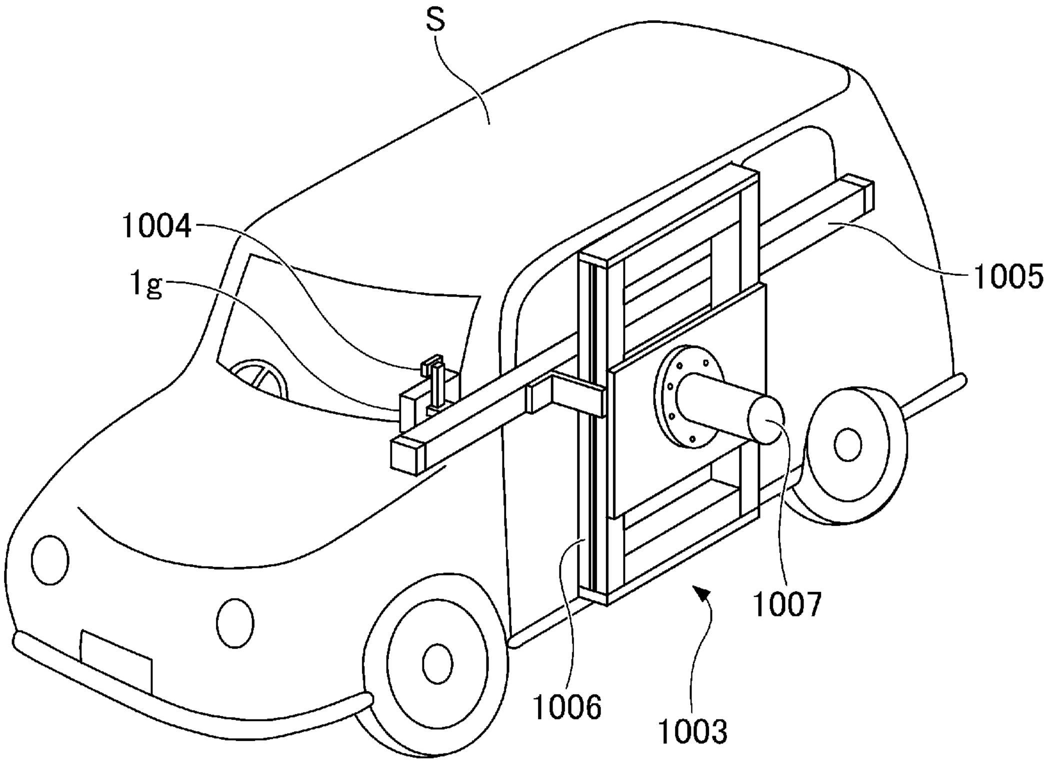

[Fig. 28]
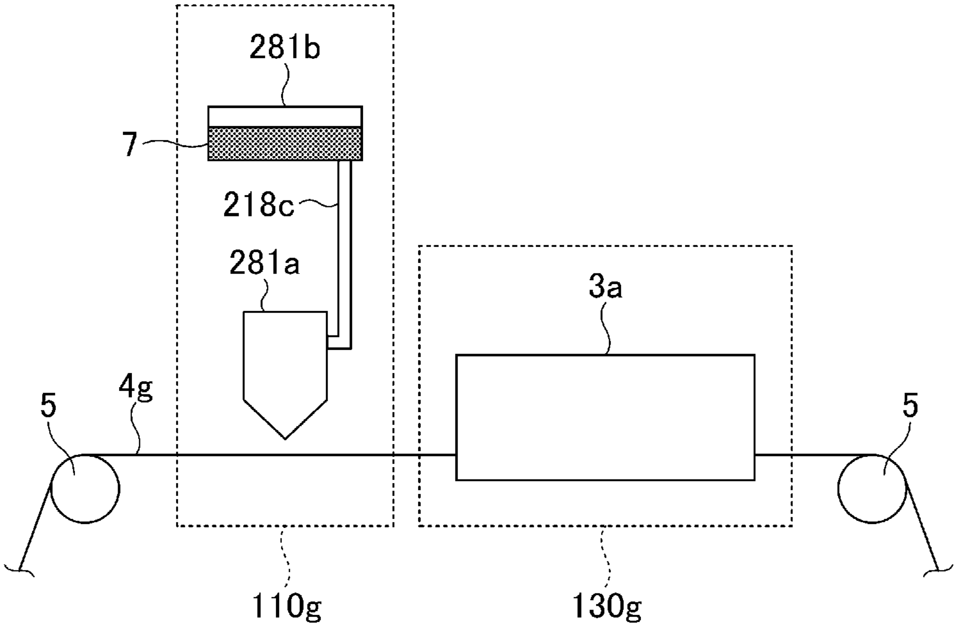
[Fig. 29]
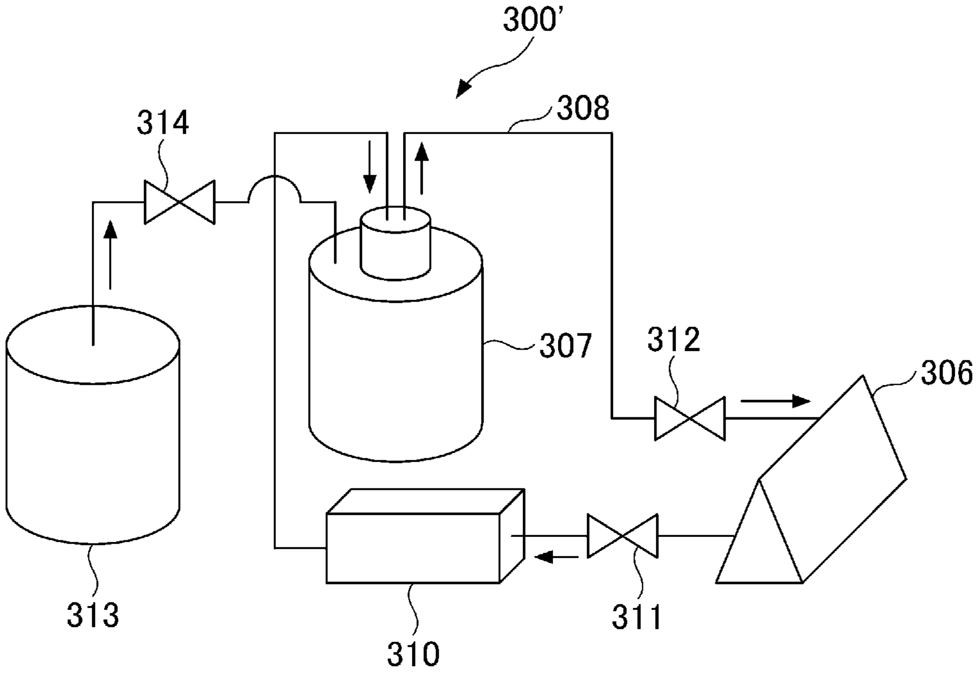

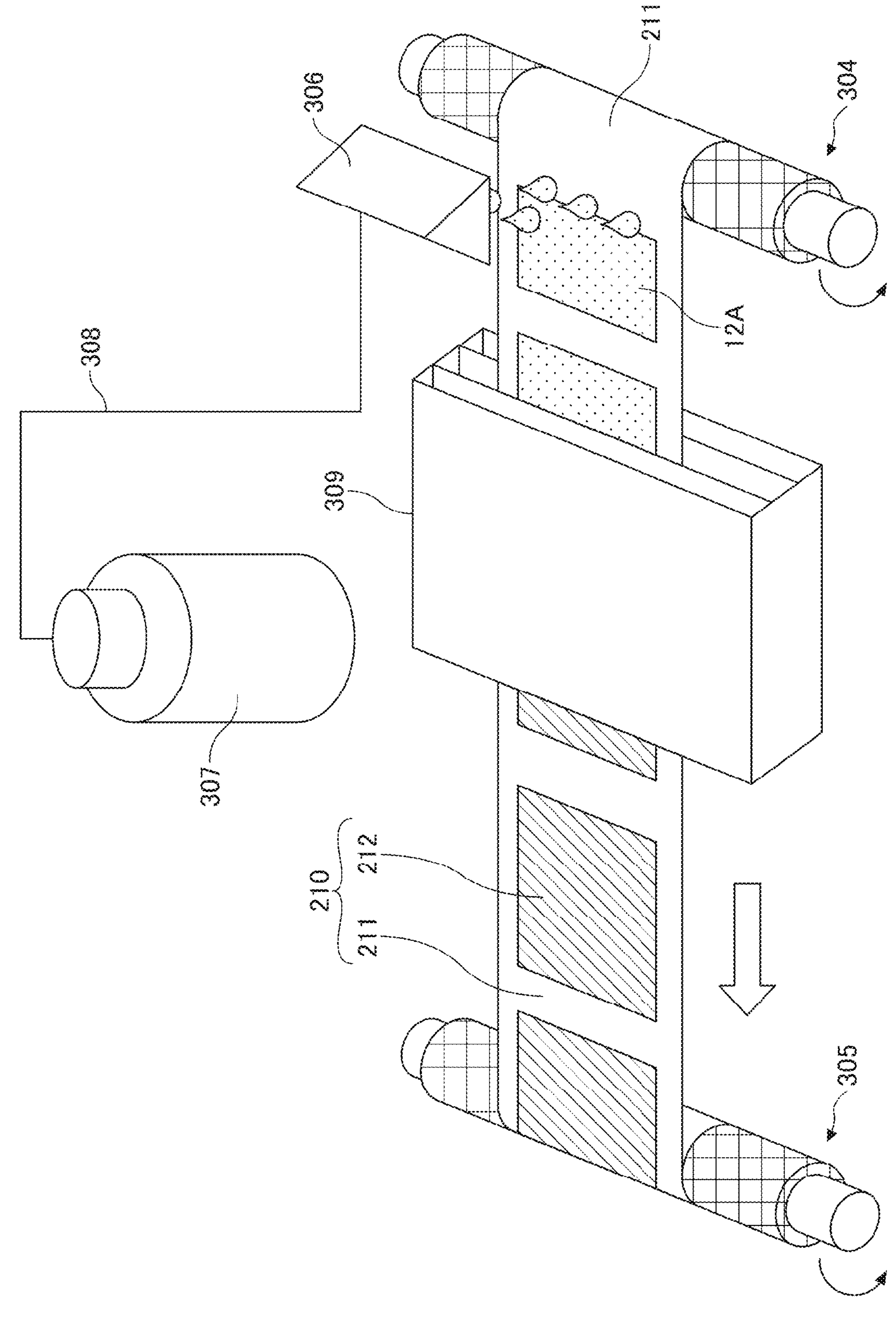
[Fig. 30]

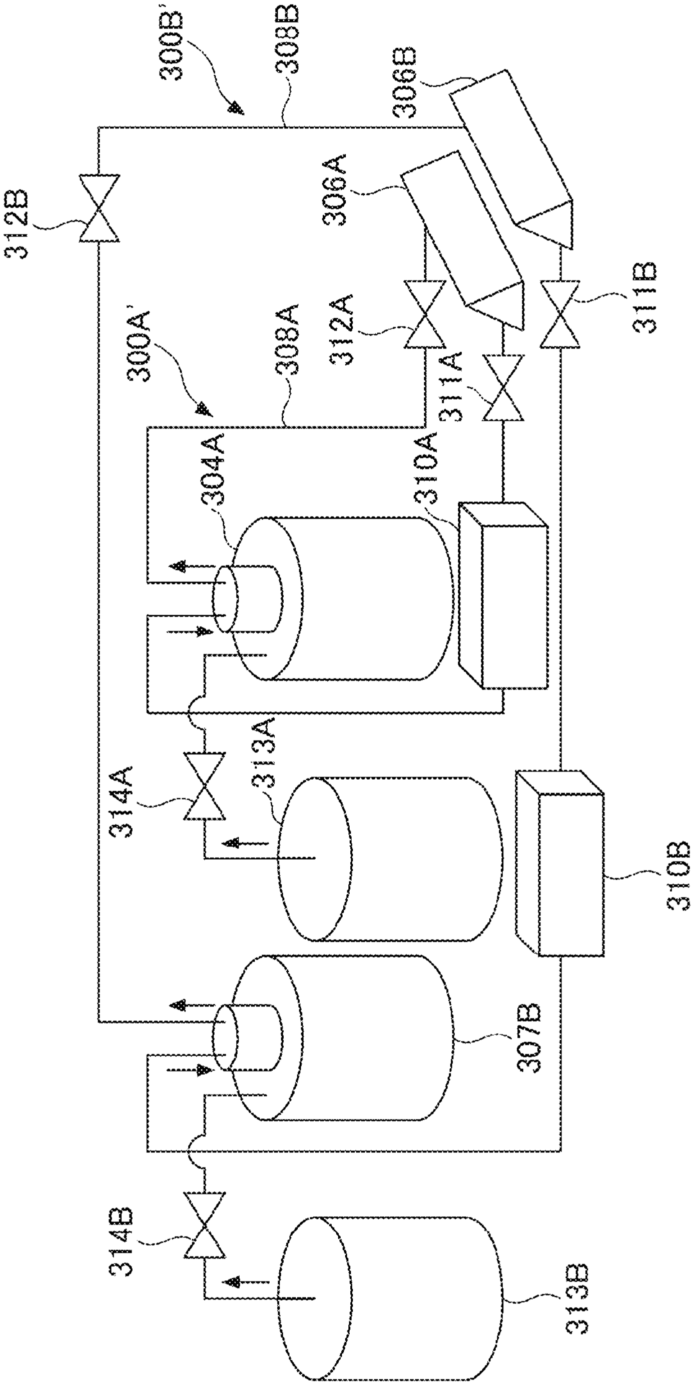
[Fig. 31]

[Fig. 32A]
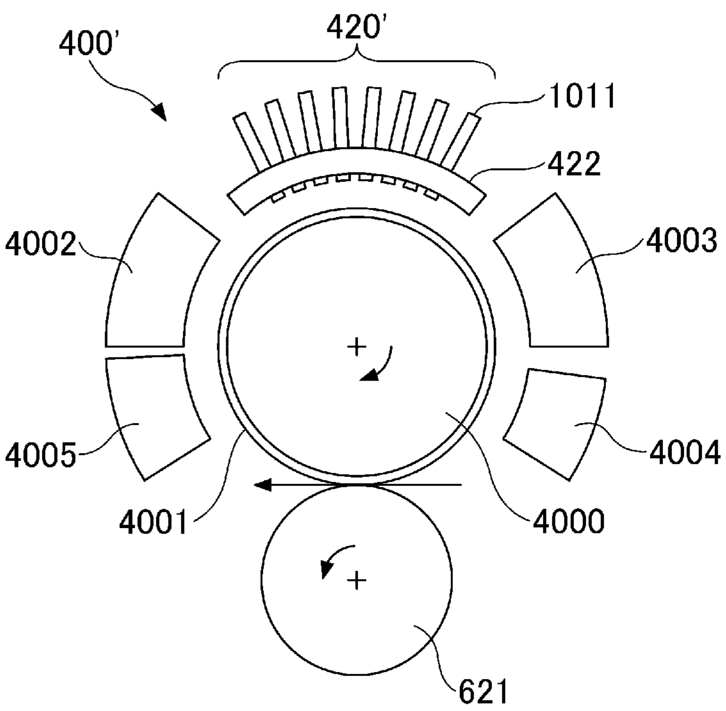
[Fig. 32B]
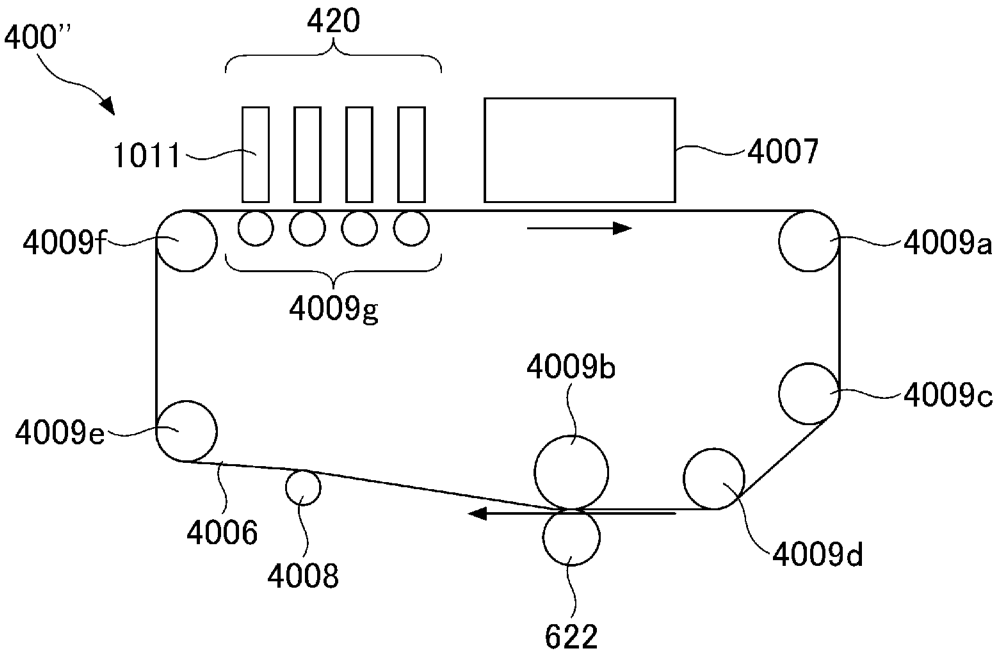

LIQUID DISCHARGE APPARATUS, COATING APPARATUS, LIQUID DISCHARGE METHOD, AND METHOD OF MANUFACTURING ELECTRODE

CROSS-REFERENCE TO RELATED APPLICATIONS

This application is based on PCT filing PCT/JP2022/032372, filed Aug. 29, 2022, which claims priority from Japanese Patent Application Nos. 2021-141829, filed Aug. 31, 2021, and 2022-091905, filed Jun. 6, 2022, the entire contents of each are incorporated herein by reference.

TECHNICAL FIELD

The present disclosure relates to liquid discharge apparatuses, coating apparatuses, liquid discharge methods, and methods of manufacturing an electrode.

BACKGROUND ART

Conventionally, there is known a liquid discharge apparatus that applies pressure to a liquid in a liquid chamber with a discharge orifice to discharge the liquid from the discharge orifice.

There is also disclosed, as a liquid discharge apparatus, an arrangement that includes discharge orifices, a liquid chamber for supplying a pressurized liquid to the discharge orifice, a valve member arranged in the chamber to open and close the discharge orifice, a driving mechanism for driving the valve member, and a driving mechanism housing space for housing the driving mechanism (for example, see PTL 1).

CITATION LIST

Patent Literature

[PTL 1] Japanese Patent No. 4123897

SUMMARY OF INVENTION

Technical Problem

A liquid discharge apparatus needs to perform a stable discharge operation.

An object of the present disclosure is to provide a liquid discharge apparatus that can perform a stable discharge operation.

Solution to Problem

A liquid discharge apparatus according to one aspect of the present disclosure includes a liquid chamber including a discharge orifice, a supplying unit configured to supply a pressurized liquid to the liquid chamber, a first valve member provided in the liquid chamber and including a valve portion configured to open and close the discharge orifice, a moving unit configured to move the first valve member, and a stirring mechanism configured to stir the pressurized liquid in the liquid chamber.

Effects of the Invention

According to the present disclosure, a liquid discharge apparatus that can perform a stable discharge operation can be provided.

BRIEF DESCRIPTION OF DRAWINGS

FIG. 1 is a view illustrating an example of the arrangement of a liquid discharge apparatus according to the first embodiment.

FIG. 2 is an enlarged view of an area A of FIG. 1.

FIG. 3 is a block diagram illustrating an example of the functional arrangement of a controller according to the first embodiment.

FIG. 4 is a graph illustrating the first example of a driving voltage of an actuator according to the first embodiment.

FIG. 5 is a graph illustrating the first example of the movement of a valve portion corresponding to the driving voltage according to the first embodiment.

FIG. 6 is a graph illustrating the second example of the driving voltage of the actuator according to the first embodiment.

FIG. 7 is a graph illustrating the second example of the movement of the valve portion corresponding to the driving voltage according to the first embodiment.

FIG. 8 is a view illustrating an example of the arrangement of a liquid discharge apparatus according to the second embodiment.

FIG. 9 is a graph illustrating the first example of a driving voltage of an actuator according to the second embodiment.

FIG. 10 is a graph illustrating the first example of the movement of a valve portion corresponding to the driving voltage according to the second embodiment.

FIG. 11 is a graph illustrating the second example of the driving voltage of the actuator according to the second embodiment.

FIG. 12 is a graph illustrating the second example of the movement of the valve portion corresponding to the driving voltage according to the second embodiment.

FIG. 13 is a cross-sectional view illustrating another example of a head according to the second embodiment, wherein a view of a state in which a discharge orifice is closed is illustrated on the upper side and a view of a state in which the discharge orifice is closed is illustrated on the lower side.

FIG. 14 is a block diagram illustrating an example of the functional arrangement of a controller according to the third embodiment.

FIG. 15 is a graph illustrating the first example of a driving voltage of an actuator according to the fourth embodiment.

FIG. 16 is a graph illustrating the first example of the movement of a valve portion corresponding to the driving voltage according to the fourth embodiment.

FIG. 17 is a graph illustrating the second example of the driving voltage of the actuator according to the fourth embodiment.

FIG. 18 is a graph illustrating the second example of the movement of the valve portion corresponding to the driving voltage according to the fourth embodiment.

FIG. 19 is a block diagram illustrating an example of the functional arrangement of a controller according to the fifth embodiment.

FIG. 20 is a view illustrating an example of the arrangement of a liquid discharge apparatus according to the sixth embodiment.

FIG. 21 is an enlarged view of an area A of FIG. 20.

FIG. 22 is a view illustrating an example of the arrangement of a liquid discharge apparatus according to the seventh embodiment.

FIG. 23 is a view illustrating an example of the arrangement of a liquid discharge apparatus according to the eighth embodiment.

FIG. 24 is a view illustrating an example of the arrangement of a liquid discharge apparatus according to the ninth embodiment.

FIG. 25 is a view illustrating an example of the arrangement of a coating apparatus according to the tenth embodiment.

FIG. 26 is a view illustrating the first example of the arrangement of the coating apparatus with respect to a target object according to the tenth embodiment.

FIG. 27 is a view illustrating the second example of the arrangement of the coating apparatus with respect to a target object according to the tenth embodiment.

FIG. 28 is a schematic view illustrating an example of an electrode manufacturing apparatus for implementing a method of manufacturing an electrode according to an embodiment.

FIG. 29 is a schematic view illustrating another example of the electrode manufacturing apparatus for implementing the method of manufacturing an electrode according to the embodiment.

FIG. 30 is a view illustrating an example of the method of manufacturing an electrode according to the embodiment.

FIG. 31 is a view illustrating another example of the method of manufacturing an electrode according to the embodiment.

FIG. 32A is a view illustrating an example of the arrangement of a printing unit that uses an intermediate transfer drum to perform printing by employing a transfer printing method.

FIG. 32B is a view illustrating an example of the arrangement of a printing unit that uses an endless intermediate transfer belt to perform printing by employing the transfer printing method.

DESCRIPTION OF EMBODIMENTS

Embodiments of the present disclosure will be described hereinafter with reference to the accompanying drawings. The same reference numerals will denote the same components throughout the drawings, and a repetitive description thereof will be omitted.

The embodiments described below present a liquid discharge apparatus and a liquid discharge method as examples for embodying the technical idea of the present disclosure, and are not intended to limit the present disclosure. The dimensions, the materials, the shapes, the relative arrangements, and the like of the components described below are intended to be exemplary and are not intended to limit the scope of the present disclosure unless otherwise specified. Furthermore, the sizes and the positional relationships of members illustrated in the drawings may be exaggerated for the purposes of clarification.

Note that the X-axis and the Y-axis may be used to indicate the respective directions in the drawings presented below. A direction in which an arrow is oriented in the X direction along the X-axis denotes the +X direction or the +X side, and a direction opposite to the +X direction is denoted as the −X direction or the −X side. In addition, a direction in which an arrow is oriented in the Y direction along the Y-axis denotes the +Y direction or the +Y side, and a direction opposite to the +Y direction is denoted as the −Y direction or the −Y side. Note that, however, these directions are not intended to limit the directions of the liquid discharge apparatus according to the embodiments when the liquid discharge apparatus is to be used. The directions of the liquid discharge apparatus according to the embodiments may be set suitably.

The liquid discharge apparatus according to the embodiments is an apparatus that includes a liquid chamber which has a discharge orifice, a supplying unit for supplying pressurized liquid to the liquid chamber, a first valve member which is provided in the liquid chamber and includes a valve portion for opening and closing the discharge orifice, a moving unit for moving the first valve member, and a controller for controlling the movement of the first valve member by the moving unit.

The movement of the first valve member includes a first movement, in which the valve portion is moved from a second position to a first position, and a second movement, in which the valve portion is reciprocated back and forth between the first position and a third position. The first position is a position where the discharge orifice opens the valve. The second position is a position where the discharge orifice is closed by the valve portion. The third position is a position between the first position and the second position.

When the valve portion is moved to the first position, the discharge orifice is opened, creating a state in which the pressurized liquid that is supplied from the supplying unit may be discharged from the discharge orifice. In contrast, when the valve portion is moved to the second position, the discharge orifice is closed, creating a no-discharge state in which the liquid may not be discharged from the discharge orifice. By using the first movement of the valve portion to control the discharge operation, the liquid discharge apparatus according to the embodiments may form a pattern, such as an image, on a target object with the liquid or may coat the target object with the liquid. In addition, increasing the pressure applied to the liquid can increase the distance to be traveled by the liquid to be discharged or increase the amount of the liquid to be discharged.

However, depending on the property of the liquid to be discharged, a channel where the liquid flows in the liquid chamber may become clogged while the liquid is being discharged when the valve portion is at the first position. This may stop the liquid from being discharged or prevent a desired amount of liquid from being discharged at a desired rate in a desired direction, resulting in an unstable discharge operation.

In the case of, for example, a highly viscous liquid, a liquid with high thixotropy, a highly concentrated liquid, or a liquid including large particles, the discharge operation becomes unstable easily because the thick liquid or particles tend to clog the channel. Note that in the present specification and in the appended claims, "high thixotropy" refers to the physical property of a liquid whose standard state is a state of high viscosity, but whose state changes into a state of low viscosity and high fluidity when stirred.

In the embodiments, the first valve member is moved in the second movement such that the valve portion is reciprocated back and forth between the first position and the third position. This movement of the first valve member causes the pressure exerted on the liquid to fluctuate in the liquid chamber, thus stirring the liquid while the liquid is being discharged. Hence, it may be possible to loosen the thick liquid or particles clogging the liquid channel or to reduce a state in which the liquid channel becomes closed due to the first valve member being distorted by the flow of the liquid. As a result, a state in which the liquid channel in the liquid chamber becomes clogged by the thick liquid or particles can be prevented while the liquid is being discharged, thus stabilizing the discharge operation.

An example of a liquid discharge apparatus for manufacturing an electrochemical device will be described hereinafter. Note that although secondary batteries and capacitors are raised as examples of electrochemical devices in general, the liquid discharge apparatus according to the embodiments can be suitably employed in the manufacturing of lithium-ion secondary batteries.

First Embodiment

<Arrangement of Liquid Discharge Apparatus 1>

The arrangement of a liquid discharge apparatus 1 according to the first embodiment will be described with reference to FIGS. 1 and 2. FIG. 1 is a view illustrating an example of the arrangement of the liquid discharge apparatus 1. FIG. 2 is an enlarged view of an area A of FIG. 1.

As illustrated in FIG. 1, the liquid discharge apparatus 1 includes a head 100, a liquid supplying unit 110, and a controller 120. In the liquid discharge apparatus 1, the liquid supplying unit 110 supplies a liquid 200 to the head 100 via a first liquid channel, and the controller 120 controls the head 100 to cause the head 100 to discharge the liquid 200. The liquid 200 which was not discharged from the head 100 is returned to the liquid supplying unit 110 via a lower channel. Note that FIG. 1 illustrates a perspective view of the interior of the head 100.

As illustrated in FIGS. 1 and 2, the head 100 includes actuators 101, first valve members 103, and liquid chambers 106.

Each actuator 101 includes a piezoelectric element that expands and contracts in accordance with an applied voltage. In the embodiment, the piezoelectric element may be a (vertical displacement type) piezoelectric element which operates in the d33 mode, and may expand and contract in the Y direction in response to the applied voltage. The material of the piezoelectric element may be, for example, lead zirconate titanate (PZT). The piezoelectric element according to the embodiment may be a stacked piezoelectric element in which a plurality of piezoelectric elements have been stacked in the Y direction to increase the amount of displacement accompanying the expansion and contraction.

An end on the −Y side of each actuator 101 is coupled and fixed to a frame 102, and an end on the +Y side of each actuator 101 is coupled to an end on the −Y side of the corresponding first valve member 103. The actuator 101 is an example of a moving unit in which a piezoelectric element expands and contracts in accordance with the applied voltage to move the first valve member 103. In the embodiment, the actuator 101 moves the first valve member 103 in the Y direction. The actuator 101 is also an example of a stirring mechanism. Note that a stirring mechanism may be provided separately from the moving unit.

The head 100 includes the plurality of liquid chambers 106 arrayed in the X direction. Each of the plurality of liquid chambers 106 includes a discharge orifice 105. The discharge orifice 105 is a through hole for discharging the liquid 200 and is formed on a discharge orifice plate 109 which forms a wall on the +Y side of the liquid chamber 106. The liquid chamber 106 stores the liquid 200 inside, and the liquid 200 is discharged from the inside of the liquid discharge chamber 106 to the outside through the discharge orifice 105.

The liquid 200 according to the embodiment may be one of, for example, a liquid whose viscosity is higher than 10 mPa·s, a liquid whose thixotropic index which indicates structural viscosity is higher than 1.3, a liquid whose solids content is higher than 20 wt %, or a liquid containing particles whose particle size is larger than 5 μm. Particles which may be contained in the liquid 200 may be particles to be used as electrode materials, and may be, for example, carbon which can be used as an anode active material, lithium transition metal oxides which can be used as cathode active materials, or ceramics which are used to form a functional layer to impart a function to the electrode.

Each first valve member 103 is provided such that a +Y-side portion of the first valve member 103 is contained in the corresponding liquid chamber 106. The first valve members 103 include metal materials and the like, and may be a plurality of needle-like or rod-like members extending in the Y direction.

Each of the plurality of the first valve members 103 is paired with a corresponding one of the plurality of the liquid chambers 106. The +Y-side portion of each first valve member 103 is inserted in the corresponding liquid chamber 106 and is configured to be movable in the Y direction. A gap formed between the first valve member 103 and the inner wall of the liquid chamber 106 in the liquid chamber 106 forms an individual liquid channel 108 where the liquid 200 flows.

The end, which is on the side of the discharge orifice 105, of the first valve member 103 forms a valve portion 104 for opening and closing the discharge orifice 105. The actuator 101 can move the first valve member 103 in the Y direction in accordance with the applied voltage to set a state in which the discharge orifice 105 is open or a state in which the discharge orifice 105 is closed.

More specifically, when the piezoelectric element of the actuator 101 contracts in the Y direction in accordance with the applied voltage, the first valve member 103 is moved to the −Y side such that the valve portion 104 is moved away from the discharge orifice 105, thus setting a state in which the discharge orifice is open. When the piezoelectric element of the actuator 101 expands in the Y direction in accordance with the applied voltage, the first valve member 103 is moved to the +Y side such that the valve portion 104 blocks the discharge orifice 105, thus setting a state in which the discharge orifice is closed.

The liquid supplying unit 110 can be an example of a supplying unit for supplying the pressurized liquid 200 to the liquid chamber 106. The liquid supplying unit 110 may include a liquid reservoir 111, an air compressor 112, an air tank 113, an air filter 114, and a regulator 115.

To maintain the pressure of the compressed air generated by the air compressor 112, the liquid supplying unit 110 temporarily retains the compressed air in the air tank 113. Subsequently, after causing the regulator 115 to decompress the compressed air to a pressure necessary for discharging the liquid 200 and removing debris, moisture, oil, and the like by the air filter 114, the liquid supplying unit 110 pressurizes the interior of the liquid storage section 111. The liquid 200 pressurized by the liquid supplying unit 110 is supplied to each of the plurality of liquid chambers 106 via a manifold 107. Note that the order of the arrangement of the regulator 115 and the air filter 114 may be switched so that after the air filter 114 has removed the debris, moisture, oil, and the like, the regulator 115 may decompress the compressed air to a pressure necessary for discharging the liquid 200.

Since the liquid 200 is pressurized by the liquid supplying unit 110, the liquid 200 is discharged to the outside through the discharge orifice 105 when the discharge orifice 105 is opened by the valve portion 104. When the discharge orifice 105 is closed by the valve portion 104, it sets a no-discharge state in which the liquid 200 is not discharged.

The controller 120 is an example of a control unit for controlling the movement of the first valve members 103 by the respective actuators 101. The arrangement of the controller 120 will be described with reference to FIG. 3.

In this embodiment, the actuator 101 is exemplified by an actuator which includes a piezoelectric element. However, the actuator 101 is not limited to this. The actuator 101 may include, for example, at least one of an electromagnet that generates a magnetic field in accordance with the applied voltage, an air cylinder that converts compressed air energy into linear motion in accordance with the applied voltage, a motor actuator that is driven in accordance with the applied voltage, or a hydraulic mechanism that generates a hydraulic pressure in accordance with the applied voltage. Effects similar to the effects of a case using a piezoelectric element can be obtained even in cases where these components are used.

Alternatively, the head 100 may include the actuators 101 which include piezoelectric elements operating in the d31 mode. The actuator 101 may include, for example, a hollow nozzle body which has, on its distal end, a discharge orifice for discharging liquid and has an inlet for injecting liquid in the vicinity of the discharge orifice, a piezoelectric element which is incorporated in the nozzle body and expands and contracts in accordance with the application of a voltage from the outside, a valve member for opening and closing the discharge orifice, a reverse spring mechanism which is provided between the valve member and the piezoelectric element, a sealing member which is fitted onto the valve member and prevents ink from flowing into the side of the piezoelectric element, and a pair of lead wires which are connected to an electrode of the piezoelectric element and to which a voltage can be applied.

Note that a first position P1, a second position P2, and a third position P3 that are illustrated in FIG. 2 to represent positions at the end, which is closer to the discharge orifice 105, of the valve portion 104 will be described later with reference to FIGS. 4 and 5.

<Example of Functional Arrangement of Controller 120>

FIG. 3 is a block diagram illustrating an example of the functional arrangement of the controller 120. As illustrated in FIG. 3, the controller 120 may include an input unit 121, a driving voltage generator 122, an amplifier 123, and an output unit 124. These functions may be implemented by an electronic circuit. Alternatively, some of these functions may be implemented by software (central processing unit [CPU]). Furthermore, these functions may be implemented by a plurality of circuits or a plurality of pieces of software.

In response to pattern data Im input from an image processing apparatus via the input unit 121, the controller 120 causes the driving voltage generator 122 to generate a driving voltage to cause the head 100 to perform a first driving operation or a second driving operation. After causing the amplifier 123 to amplify the driving voltage generated by the driving voltage generator 122, the controller 120 outputs the amplified driving voltage to each actuator 101 via the output unit 124.

<Example of Driving Voltage of Actuator 101 and Movement of Valve Portion 104>

The driving voltage for driving the actuator 101 and the movement of the valve portion 104 will be described next with reference to FIGS. 4 and 5. FIG. 4 is a graph illustrating a first example of the driving voltage of the actuator 101. FIG. 5 is a graph illustrating a first example of the movement of the valve portion 104 in accordance with the driving voltage of FIG. 4.

The abscissa of each of FIGS. 4 and 5 indicates the time. The ordinate of FIG. 4 indicates the value of the driving voltage, and the ordinate of FIG. 5 indicates the position of the valve portion 104 in the Y direction. The time indicated by the abscissa of FIG. 4 matches the time indicated by the abscissa of FIG. 5. The position of the valve portion 104 illustrated in FIG. 5 changes in accordance with the value of the driving voltage illustrated in FIG. 4.

The value of the driving voltage and the position of the valve portion 104 have an approximately linear relationship. An approximately linear relationship represents a relationship which is linear overall, but may include deviations from the line such as linearity errors or time delays in the changes in the position of the valve portion 104 with respect to the application of the voltage.

By outputting, to the head 100, the waveform of the driving voltage which is generated by the driving voltage generator 122 and is amplified by the amplifier 123, the controller 120 can supply a time-varying driving voltage to the actuator 101 as illustrated in FIG. 4.

When a first voltage E1 is applied to the actuator 101, the piezoelectric element of the actuator 101 contracts in the Y direction, causing the first valve member 103 to move in the −Y direction such that the valve portion 104 is moved away from the discharge orifice 105 to open the discharge orifice 105. In this case, the end, which is closer to the discharge orifice 105, of the valve portion 104 is positioned at the first position P1.

When a second voltage E2 higher than the first voltage E1 is applied to the actuator 101, the piezoelectric element of the actuator 101 expands in the Y direction, causing the first valve member 103 to move in the +Y direction such that the valve portion 104 blocks the discharge orifice 105 to close the discharge orifice 105. In this case, the end, which is closer to the discharge orifice 105, of the valve portion 104 is at the second position P2.

When a third voltage E3 which is higher than the first voltage E1 but is lower than the second voltage E2 is supplied to the actuator 101, the end, which is closer to the discharge orifice 105, of the valve portion 104 is moved to the third position P3 which is between the first position P1 and the second position P2.

In other words, the controller 120 applies the first voltage E1 to the actuator 101 to move the valve portion 104 to the first position P1, applies the second voltage E2 to the actuator 101 to move the valve portion 104 to the second position P2, and applies the third voltage E3 to the actuator 101 to move the valve portion 104 to the third position P3. The first voltage E1 may be lower than the second voltage E2. The third voltage E3 may be higher than first voltage E1 but lower than second voltage E2.

The changes in the value of the driving voltage and the changes in the position of the valve portion 104 will be described in time series. First, the controller 120 applies the second voltage E2 to the actuator 101 such that the valve portion 104 is moved to the second position P2 to completely close the discharge orifice 105. Subsequently, the controller 120 applies the first voltage E1 to the actuator 101 such that the valve portion 104 is moved from the second position P2 to the first position P1 to completely open the discharge orifice 105. The liquid 200 is discharged from the discharge orifice 105 in this completely open state. The movement of the valve portion 104 from the second position P2 to the first position P1 corresponds to a first movement M1.

After time t1 [sec] has elapsed since the liquid 200 started to be discharged, the controller 120 applies the third voltage E3 to the actuator 101 to move the valve portion 104 from the first position P1 to the third position P3. Although the discharge orifice 105 changes to a state in which it is not completely open, the liquid 200 continues to be discharged since the discharge orifice 105 is not closed.

Subsequently, after time t2 has further elapsed, the controller 120 applies the first voltage E1 to the actuator 101 to move the valve portion 104 to the first position P1. The discharge orifice 105 is completely opened, and the liquid 200 continues to be discharged. The reciprocating movement in which the valve portion 104 is moved from the third position P3 to the first position P1 after having been moved from the first position P1 to the third position P3 corresponds to a second movement M2.

Thereafter, in a similar manner, the controller 120 repetitively performs this operation of applying the third voltage E3 to the actuator 101 after time t1 has elapsed and further applying the first voltage E1 to the actuator 101 after time t2 has elapsed. This repetitive performance of the aforementioned operation allows the head 100 to discharge the liquid 200 while reciprocating the valve portion 104 back and forth between the first position P1 and the third position P3. As a result, a pressure fluctuation is generated in the liquid 200 in the liquid chamber 106, thus stirring the liquid 200.

When the discharge operation is to be stopped, the controller 120 applies the second voltage E2 to the actuator 101 to close the discharge orifice 105.

Although time t1 for applying the third voltage E3 is not particularly limited, it may be preferable for time t1 to be longer or equal to the time taken by the valve portion 104 to move to the third position P3 in accordance with the application of the third voltage E3. This may make it easier to adjust the amount of displacement by the driving voltage.

In the viewpoint of achieving favorable effects from the pressure fluctuation and the stirring, it may be preferable for the third voltage E3 to satisfy $E2>E3\geq(E2-E1)\times0.05+E1$. For example, the first voltage E1 may be 10 V, the second voltage E2 may be 100 V, the third voltage E3 may be 20 V, or the like. Time t1 may be 100 usec, time 12 may be 10 usec, or the like.

<Effects of Liquid Discharge Apparatus 1>

As described above, the liquid discharge apparatus 1 may include the liquid chambers 106 which include the respective discharge orifices 105, the liquid supplying unit 110 (supplying unit) for supplying the pressurized liquid 200 to the liquid chambers 106, the first valve members 103 provided in the respective liquid chambers 106, the actuators 101 (moving units) for moving the respective first valve members 103, and the controller 120 (control unit) for controlling the movement of each first valve member 103 by the corresponding actuator 101. The movement of each first valve member 103 includes the first movement M1 in which the valve portion 104 is moved from the second position P2 to the first position P1 and the second movement M2 in which the valve portion 104 is reciprocated back and forth between the first position P1 and the third position P3. The first position P1 is a position where the discharge orifice 105 is opened by the valve portion 104, the second position P2 is a position where the discharge orifice 105 is closed by the valve portion 104, and the third position P3 is a position between the first position P1 and the second position P2.

For example, the controller 120 may apply the first voltage E1 to the actuator 101 to move the valve portion 104 to the first position P1, apply the second voltage E2 to the actuator 101 to move the valve portion 104 to the second position P2, and apply the third voltage E3 to the actuator 101 to move the valve portion 104 to the third position P3. The first voltage E1 may be lower than the second voltage E2, and the third voltage E3 may be higher than the first voltage E1 but lower than the second voltage E2.

When the valve portion 104 is moved to the first position P1, the discharge orifice 105 is opened, thus setting a state in which the pressurized liquid 200 supplied from the liquid supplying unit 110 is discharged from the discharge orifice 105. In contrast, when the valve portion 104 is moved to the second position P2, the discharge orifice 105 is closed, thus setting a no-discharge state in which the liquid is not discharged from the discharge orifice 105. By employing the first movement M1 of the valve portion 104 to control the discharge of the liquid 200, the liquid discharge apparatus 1 can apply the liquid 200 to an electrode substrate to manufacture an electrode and an electrochemical device including the electrode. In addition, increasing the pressure applied to the liquid 200 can increase the distance of travel of the liquid 200. Note that the electrode substrate may be a collector such as aluminum foil, copper foil, or the like. The electrode substrate may also be an electrode substrate which includes an active material thereon.

Additionally, in the liquid discharge apparatus 1, by executing the second movement M2 in a state in which the liquid 200 is being discharged, the first valve member 103 can generate a pressure fluctuation in the liquid 200 in the liquid chamber 106 to stir the liquid 200. Hence, it may be possible to loosen the thick liquid or particles, reducing a state in which the individual liquid channel 108 becomes closed due to the first valve member 103 being deformed by the flow of the liquid 200. As a result, the liquid discharge apparatus 1 that can stably discharge the liquid 200 by suppressing the thick liquid and particles from clogging the channel in the liquid chamber during a state in which the liquid 200 is being discharged may be provided.

In the embodiment, a state in which the third voltage E3 is applied to the actuator 101 and the valve portion 104 is positioned at the third position P3 may also be referred to as a state in which the discharge orifice 105 is not completely closed. A state in which the discharge orifice 105 is not completely closed refers to a state in which the discharge orifice 105 is at least slightly open and the liquid 200 can be discharged from the discharge orifice 105 without interruption. By reciprocating the valve portion 104 back and forth between the first position P1 and the third position P3, the liquid discharge apparatus 1 can stir the liquid 200 by generating a pressure fluctuation in the liquid 200 in the liquid chamber 106, thus allowing the discharge to be continued nonstop.

In the viewpoint of achieving favorable effects in regard to the pressure fluctuation and the stirring, it may be preferable for the second movement M2 to be performed repetitively. Repetitively performing the second movement M2 allows a nozzle hole to be opened, thus allowing a pressure fluctuation to be generated in a pulsating manner near the nozzle hole while the liquid is being discharged. Hence, it may be possible to suppress the flow of the liquid from stagnating and to stir the liquid in a direction in which the liquid is pushed out from the nozzle hole. Therefore, the liquid can be stirred more favorably than a case where the pressure fluctuation is generated in a state in which the valve is closed. Note that although the repetitive execution of the second movement M2 may be periodic or aperiodic, it is preferable for the valve to execute 100 reciprocating movements per second.

In addition, in cases where the liquid 200 is at least one of a liquid whose viscosity is higher than 10 mPa·s, a liquid whose thixotropic index indicating the structural viscosity is higher than 1.3, a liquid whose solids content is higher than 20 wt %, or a liquid containing particles whose particle size is larger than 5 μm, the channel inside each liquid chamber may become clogged more easily due to thick liquid and particles. Hence, it may be particularly effective to use the embodiment.

The embodiment described a case where the discharge orifice 105 becomes completely open due to the piezoelectric element of the actuator 101 completely contracting when the valve portion 104 is moved to the first position P1. However, the embodiment is not limited to this. In the embodiment, an open state set when the valve portion 104 is moved in the first position P1 includes not only a state in which the discharge orifice 105 is completely open but also a state in which the discharge orifice 105 is partially open. The effects described above can also be achieved in a state where the discharge orifice 105 is partially open. Furthermore, the amount of liquid 200 to be discharged can also be changed in accordance with the state of the opening of the discharge orifice 105.

Modification of First Embodiment

The driving voltage of the liquid discharge apparatus 1 can be modified in various ways. A modification of the driving voltage according to the first embodiment will be described below. Note that the same reference symbols will denote components which are the same as those of the first embodiment, and a repetitive description thereof will be omitted. This point is similarly applicable to the embodiments and their respective modifications to be described later.

FIG. 6 is a graph illustrating the second example of the driving voltage for driving the actuator 101. FIG. 7 is a graph illustrating the second example of the movement of the valve portion 104 in correspondence with the driving voltage. FIGS. 6 and 7 may be viewed in the same manner as FIGS. 4 and 5. Subsequent graphs illustrating the driving voltage for driving the actuator 101 and the movement of the valve portion 104 in correspondence with the driving voltage may also be viewed in the same manner as FIGS. 4 and 5.

The changes in the value of the driving voltage and the changes in the position of the valve portion 104 will be described in time series. First, the controller 120 applies the second voltage E2 to the actuator 101 to move the valve portion 104 in the second position P2 to completely close the discharge orifice 105. Thereafter, the controller 120 applies the third voltage E3 to the actuator 101 to move the valve portion 104 from the second position P2 to the third position P3 to open the discharge orifice 105. Although the discharge orifice 105 is not completely open, the liquid 200 is discharged from the discharge orifice 105 since the discharge orifice 105 is not closed. The movement of the valve portion 104 from the second position P2 to the third position P3 in the direction of the first position P1 corresponds to the first movement M1.

After time t1 [sec] has elapsed since the liquid 200 started to be discharged, the controller 120 applies the first voltage E1 to the actuator 101 to move the valve portion 104 from the third position P3 to the first position P1. The discharge orifice 105 becomes completely open, and the liquid 200 continues to be discharged.

Subsequently, after time t2 has elapsed, the controller 120 applies the third voltage E3 to the actuator 101 again, thus moving the valve portion 104 to the third position P3. Since the discharge orifice 105 is not closed, the liquid 200 continues to be discharged. The reciprocating movement in which the valve portion 104 is moved from the first position P1 to the third position P3 after having been moved from the third position P3 to the first position P1 corresponds to the second movement M2.

Subsequently, in a similar manner, the controller 120 repetitively performs the operation of applying the first voltage E1 to the actuator 101 after time t1 has elapsed and further applying the third voltage E3 after time t2 has elapsed. This repetitive performance of the aforementioned operation allows the head 100 to discharge the liquid 200 while reciprocating the valve portion 104 back and forth between the first position P1 and the third position P3. As a result, a pressure fluctuation is generated in the liquid 200 in the liquid chamber 106, thus stirring the liquid 200.

When the discharge operation is to be stopped, the controller 120 applies the second voltage E2 to the actuator 101 to close the discharge orifice 105.

Although time t1 for applying the first voltage E1 is not particularly limited, it may be preferable for time t1 to be longer or equal to the time taken by the valve portion 104 to move to the first position P1 in accordance with the application of the first voltage E1. This may make it easier to adjust the amount of displacement by the driving voltage. Furthermore, since setting the first voltage E1 to approximately 0 V increases the voltage difference between the third voltage E3 and the first voltage E1, the amount of movement between the third position P3 and the first position P1 can be increased. Therefore, such a setting may be more preferable as the effects of the pressure fluctuation and the effects of the stirring may be achieved more favorably.

In the viewpoint of achieving favorable effects from pressure fluctuation and stirring, it may be preferable for the difference between the third voltage E3 and the first voltage E1 to be higher than or equal to 5% of the difference between the second voltage E2 and the first voltage E1, that is, it may be preferable for the difference to be $E2>E3\geq(E2-E1)\times 0.05+E1$.

Second Embodiment

FIG. 8 is a view for describing a head 100*a* as the second example of the head included in the liquid discharge apparatus 1. FIG. 9 is a graph illustrating the first example of the driving voltage of an actuator 101*a* included in the head 100*a*. FIG. 10 is a graph illustrating the first example of the movement of the valve portion 104 in correspondence with the driving voltage supplied to the actuator 101*a*.

As illustrated in FIG. 8, the head 100*a* includes the actuators 101*a*. Each of the actuators 101*a* includes a piezoelectric element operating in the d31 mode.

As illustrated in FIGS. 9 and 10, when the first voltage E1 is applied to the actuator 101*a*, the piezoelectric element of the actuators 101*a* contracts in the Y direction, causing the first valve member 103 to move in the −Y direction such that the valve portion 104 is moved away from the discharge orifice 105 to open the discharge orifice 105. In this case, the valve portion 104 is positioned at the first position P1.

When the second voltage E2 which is lower than the first voltage E1 is applied to the actuators 101*a*, the piezoelectric element of the actuators 101*a* expands in the Y direction, causing the first valve member 103 to move in the +Y direction such that the valve portion 104 blocks the discharge orifice 105 and the discharge orifice 105 is closed. In this case, the valve portion 104 positioned at the second position P2.

When the third voltage E3 which is lower than the first voltage E1 but higher than the second voltage E2 is applied to the actuators 101*a*, the valve portion 104 moves to the third position P3 between the first position P1 and the second position P2.

In other words, the controller 120 applies the first voltage E1 to the actuator 101*a* to move the valve portion 104 to the first position P1, applies the second voltage E2 to the actuator 101*a* to move the valve portion 104 to the second position P2, and applies the third voltage E3 to the actuator 101*a* to move the valve portion 104 to the third position P3. The first voltage E1 may be higher than the second voltage E2. The third voltage E3 may be higher than the second voltage E2 but lower than the first voltage E1.

The changes in the value of the driving voltage and the changes in the position of the valve portion 104 will be described in time series. First, the controller 120 applies the second voltage E2 to the actuators 101*a* to move the valve portion 104 to completely close the discharge orifice 105. Subsequently, the controller 120 applies the first voltage E1 to the actuator 101*a* such that the valve portion 104 is moved from the second position P2 to the first position P1, thereby completely opening the discharge orifice 105. The liquid 200 is discharged from the discharge orifice 105 in this completely open state. The movement of the valve portion 104 from the second position P2 to the first position P1 corresponds to the first movement M1.

After time t1 [sec] has elapsed since the liquid 200 started to be discharged, the controller 120 applies the third voltage E3 to the actuator 101*a* to move the valve portion 104 from the first position P1 to the third position P3. Although the discharge orifice 105 changes to a state in which it is not completely open, the liquid 200 continues to be discharged since the discharge orifice 105 is not closed.

Subsequently, after time t2 has further elapsed, the controller 120 applies the first voltage E1 to the actuator 101*a* to move the valve portion 104 to the first position P1. The discharge orifice 105 is completely opened, and the liquid 200 continues to be discharged. The reciprocating movement in which the valve portion 104 is moved from the third position P3 to the first position P1 after having been moved from the first position P1 to the third position P3 corresponds to the second movement M2.

Thereafter, in a similar manner, the controller 120 repetitively performs this operation of applying the third voltage E3 to the actuator 101*a* after time t1 has elapsed and further applying the first voltage E1 to the actuator 101*a* after time t2 has elapsed. This repetitive performance of the aforementioned operation allows the head 100*a* to discharge the liquid 200 while reciprocating the valve portion 104 back and forth between the first position P1 and the third position P3. As a result, a pressure fluctuation is generated in the liquid 200 in the liquid chamber 106, thus stirring the liquid 200.

When the discharge operation is to be stopped, the controller 120 applies the second voltage E2 to the actuator 101*a* to close the discharge orifice 105.

Although time t2 for applying the third voltage E3 is not particularly limited, it may be preferable for time t2 to be longer or equal to the time taken by the valve portion 104 to move to the third position P3 in accordance with the application of the third voltage E3. This may make it easier to adjust the amount of displacement by the driving voltage. In the viewpoint of achieving favorable effects from the pressure fluctuation and the stirring, it may be preferable for the third voltage E3 to satisfy $E1 \times 0.95 \geq E3 > 0$.

The effects of this embodiment are similar to those of the first embodiment.

The head 100*a* may also include the actuators 101*a* that include piezoelectric elements which operate in the d33 mode. Each actuator 101*a* may include, for example, a hollow nozzle body which has a discharge orifice on its distal end for discharging liquid and an injection orifice for injecting liquid in the vicinity of the discharge orifice, a piezoelectric element which is incorporated in the nozzle body and expands and contracts in accordance with the application of a voltage from the outside, a valve member for opening and closing the discharge orifice, a reverse spring mechanism which is provided between the valve member and the piezoelectric element, a sealing member which is fitted onto the valve member and prevents ink from flowing into the side of the piezoelectric element, and a pair of lead wires which are connected to an electrode of the piezoelectric element and to which a voltage can be applied.

Modification of Second Embodiment

FIG. 11 is a graph illustrating the second example of the driving voltage for driving the actuator 101*a*. FIG. 12 is a graph illustrating the second example of the movement of the valve portion 104 in correspondence with the driving voltage.

The changes in the value of the driving voltage and the changes in the position of the valve portion 104 will be described in time series. First, the controller 120 applies the second voltage E2 to the actuator 101*a* to move the valve portion 104 in the second position P2 to completely close the discharge orifice 105. Thereafter, the controller 120 applies the third voltage E3 to the actuator 101*a* to move the valve portion 104 from the second position P2 to the third position P3 to open the discharge orifice 105. Although the discharge orifice 105 is not completely open, the liquid 200 is discharged from the discharge orifice 105 since the discharge orifice 105 is not closed. The movement of the valve portion 104 from the second position P2 to the third position P3 in the direction of the first position P1 corresponds to the first movement M1.

After time t1 [sec] has elapsed since the liquid 200 started to be discharged, the controller 120 applies the first voltage E1 to the actuator 101*a* to move the valve portion 104 from the third position P3 to the first position P1. The discharge orifice 105 becomes completely open, and the liquid 200 continues to be discharged.

Subsequently, after time t2 has further elapsed, the controller 120 applies the third voltage E3 to the actuator 101*a* again to move the valve portion 104 to the third position P3. Since the discharge orifice 105 is not closed, the liquid 200 continues to be discharged. The reciprocating movement in which the valve portion 104 is moved from the first position P1 to the third position P3 after having been moved from the third position P3 to the first position P1 corresponds to the second movement M2.

Thereafter, in a similar manner, the controller 120 repetitively performs this operation of applying the first voltage E1 to the actuator 101*a* after time t1 has elapsed and further applying the third voltage E3 to the actuator 101 after time t2 has elapsed. This repetitive performance of the aforementioned operation allows the head 100*a* to discharge the liquid 200 while reciprocating the valve portion 104 back and forth between the first position P1 and the third position P3. As a result, a pressure fluctuation is generated in the liquid 200 in the liquid chamber 106, thus stirring the liquid 200.

When the discharge operation is to be stopped, the controller 120 applies the second voltage E2 to the actuator 101*a* to close the discharge orifice 105.

Although time t1 for applying the first voltage E1 is not particularly limited, it may be preferable for time t1 to be longer or equal to the time taken by the valve portion 104 to move to the first position P1 in accordance with the application of the first voltage E1. This may make it easier to adjust the amount of displacement by the driving voltage. Furthermore, since setting the first voltage E1 to approximately 0 V increases the voltage difference between the third voltage E3 and the first voltage E1, the amount of movement between the third position P3 and the first position P1 can be increased. Therefore, such a setting may be more preferable as the effects of the pressure fluctuation and the effects of the stirring may be achieved more favorably.

In the viewpoint of achieving favorable effects from the pressure fluctuation and the stirring, it may be preferable for the difference between the second voltage E2 and the third voltage E3 to be higher than or equal to 5% of the difference between the second voltage E2 and the first voltage E1, that is, it may be preferable for the difference to be $E2-(E2-E1)\times 0.05>E3\geq E1$.

(Modification of Head)

FIG. 13 is a cross-sectional view illustrating an example of the arrangement of a head 100*b* as another example of the head according to the second embodiment. The view on the upper side of FIG. 13 illustrates a state in which the discharge orifice 105 is closed. The view on the lower side of FIG. 13 illustrates a state in which the discharge orifice 105 is open.

The head 100*b* may include a nozzle body 4, an actuator 101*b*, the first valve member 103, a reverse spring mechanism 8, a sealing member 6, and a pair of lead wires 9 and 10.

The nozzle body 4 has, on its distal end, the discharge orifice 105 for discharging the liquid 200 and has the inlet 3, which is for injecting the liquid 200, in the vicinity of the discharge orifice 105. The actuator 101*b* is incorporated in the nozzle body 4 and contracts and expands in accordance with the application of the driving voltage from outside. The first valve member 103 opens and closes the discharge orifice 105. The reverse spring mechanism 8 is provided between the first valve member 103 and the actuator 101*b*. The sealing member 6 is fitted onto the first valve member 103 to prevent the liquid 200 from flowing into the side of the actuator 101*b*. The pair of lead wires 9 and 10 are connected to an electrode of the actuator 101*b* and are used for voltage application.

The nozzle body 4 may be formed overall in the shape of a tube or in the shape of a square tube, and is closed except for the discharge orifice 105 and the inlet 3. The discharge orifice 105 is an opening which has been formed at the distal end of the valve portion 104, and is configured to discharge the liquid 200. In the vicinity of the discharge orifice 105, the inlet 3 is provided on the side surface of the nozzle body 4 and is coupled to an ink tank so that the liquid 200 may be supplied continuously to the head 100*b* by a pressurizing unit.

The actuator 101*b* is formed from zirconia ceramics or the like, and is formed to have an appropriate outer shape and thickness in accordance with the amount of the liquid 200 to be discharged. The actuator 101*b* is controlled by the driving voltage from the controller 120.

The sealing member 6 is, for example, a packing, an O-ring, or the like. Fitting the sealing member 6 onto the first valve member 103 prevents the liquid from flowing from the side of the inlet 3 into the side of the actuator 101*b*.

The reverse spring mechanism 8 is an elastic member formed by molding a thin metal plate or rubber, soft resin, or the like which is suitably deformable. The reverse spring mechanism 8 includes a deforming part 8*a* which is formed to abut a proximal-end surface of the first valve member 103 and whose cross section has an approximately trapezoidal shape, a fixed part 8*b* to be fixed to an interior wall surface of the nozzle body 4, and a guiding part 8*c* connected to the end of the actuator 101*b*. A long side (corresponding to the bottom surface of the trapezoid) of the trapezoidal-shaped deforming part 8*a* is a flexing side 8*d* coupled to the fixed part 8*b*.

In the reverse spring mechanism 8, the application of the driving voltage to the actuator 101*b* causes the actuator 101*b* to expand so that the guiding part 8*c* moves to the side of the discharge orifice 105 and presses the central portion of the flexing side 8*d* of the deforming part 8*a*. This causes a top (corresponding to the upper surface of the trapezoid) of the deforming part 8*a* coupled to the first valve member 103 to move to the side of the actuator 101*b*. The discharge orifice 105 is opened when the first valve member 103 is pulled toward the side of the actuator 101*b* by a distance das illustrated in FIG. 13.

By appropriately adjusting the length of the flexing side 8*d* or the distance between the flexing side 8*d* and the top, which is the portion coupled to the first valve member 103, of the deforming part 8*a* of the reverse spring mechanism 8, the length moved by the first valve member 103 can be made longer than the length of the expansion by the actuator 101*b*. In other words, the reverse spring mechanism 8 can amplify a slight expansion of the actuator 101*b*.

Since this allows the length of the expensive actuator 101*b* to be shortened relative to the conventional length, the production cost of the head 100*b* can be reduced significantly. For example, the length of the actuator 101*b* can be shortened by letting the distance of the movement of the first valve member 103 be twice the distance of the movement of the actuator 101*b*.

Since the actuator 101*b* returns to its original shape in a state where the driving voltage is not applied to the actuator 101*b*, no external force is applied onto the reverse spring mechanism 8, and deformation does not occur. In contrast, since the actuator 101*b* expands when the driving voltage is applied to the actuator 101*b*, the guiding part 8*c* of the reverse spring mechanism 8 is moved to the side of the discharge orifice 105 in accordance with the expansion. Hence, the deforming part 8*a* is deformed in a crushed manner.

Effects similar to those of the head 100*a* described above can also be achieved by using this kind of head 100*b* as the head according to the second embodiment.

Third Embodiment

A liquid discharge apparatus 1*c* according to the third embodiment will be described.

FIG. 14 is a block diagram illustrating an example of the functional arrangement of a controller 120*c* included in the liquid discharge apparatus 1*c*. As illustrated in FIG. 14, the controller 120*c* includes a first voltage modifier 125, a movement counter 126, and a second voltage modifier 127. These functions may be implemented by an electrical circuit. Alternatively, some of these functions may be implemented by software. Furthermore, these functions may be implemented by a plurality of circuits or a plurality of pieces of software.

If the second voltage E2 is higher than the first voltage E1, the controller 120*c* may apply the third voltage E3, which is higher than the first voltage E1 by a predetermined voltage ΔV, to the actuator 101 for the second movement M2. If the first voltage E1 is higher than the second voltage E2, the controller 120*c* may apply the third voltage E3, which is higher than the second voltage E2 by the predetermined voltage ΔV, to the actuator 101 for the second movement M2.

The liquid discharge apparatus 1*c* includes a temperature sensor 130 that detects the temperature of the actuator 101.

The first voltage modifier 125 is an example of a first voltage modifying unit that modifies the predetermined voltage ΔV in accordance with the temperature of the actuator 101 detected by the temperature sensor 130.

The movement counter 126 counts the number of times the actuator 101 has performed the first movement M1 and outputs the result of the count to the second voltage modifier 127.

The second voltage modifier 127 is an example of a second voltage modification unit that modifies the third voltage E3 in accordance with the number of the first movements M1 performed by the actuator 101 and counted by the movement counter 126.

The amount of movement of the first valve member 103 with respect to the driving voltage per unit voltage may change depending on the temperature of the actuator 101. In addition, if the number of the first movements M1 by the actuator 101 increases, the amount of movement of the first valve member 103 with respect to the driving voltage per unit voltage may decrease.

The controller 120*c* causes the first voltage modifier 125 to change the predetermined voltage ΔV in accordance with the temperature of the actuator 101. In addition, the controller 120*c* causes the second voltage modifier 127 to change the predetermined voltage ΔV in accordance with the number of the first movements M1 by the actuator 101. This allows the amount by which the discharge orifice 105 is opened in accordance with the driving voltage to be approximately constant, thereby stabilizing the discharge amount. Other effects are similar to those of the first embodiments.

Fourth Embodiment

The fourth embodiment will be described. An actuator 101*d* according to the embodiment moves the first valve member 103 in accordance with the applied voltage, and the controller 120 applies, to the actuator 101*d*, a voltage for moving the valve portion 104 to the second position P2 over an application period Δt which is shorter than a predetermined period Δt0. The predetermined period Δt0 is a time taken to move the valve portion 104 to the second position P2 when the voltage has been applied to the actuator 101*d* to move the valve portion 104 to the second position P2.

After the driving voltage is applied, it takes a predetermined period of time for the actuator including the piezoelectric element to move the distance corresponding to the applied driving voltage. Hence, by applying the driving voltage to the actuator 101*d* over the application period Δt which is shorter than the predetermined period Δt0, the movement of the valve portion 104 can be stopped before the valve portion 104 reaches the second position P2. As a result, in this embodiment, the valve portion 104 is reciprocated back and forth between the first position P1 and the third position P3 without the third voltage E3 being applied to the actuator 101*d*.

FIG. 15 is a graph illustrating the first example of the driving voltage of the actuator 101*d*. FIG. 16 is a graph illustrating the first example of the movement of the valve portion 104 in correspondence with the driving voltage.

The actuator 101*d* includes a piezoelectric element operating in the d33 mode.

As illustrated in FIGS. 15 and 16, applying the first voltage E1 to the actuator 101*d* causes the piezoelectric element of the actuator 101*d* to contract, thus moving the first valve member 103 in the −Y direction. This moves the valve portion 104 away from the discharge orifice 105, and the discharge orifice 105 is opened. In this case, the valve portion 104 is positioned at first position P1.

When the second voltage E2 that is higher than the first voltage E1 is applied to the actuator 101*d*, the piezoelectric element of the actuator 101*d* expands in the Y direction, causing the first valve member 103 to move in the +Y direction such that the valve portion 104 blocks the discharge orifice 105 to close the discharge orifice 105. In this case, the valve portion 104 is positioned at the second position P2.

The changes in the value of the driving voltage and the changes in the position of the valve portion 104 will be described in time series. First, the controller 120 applies the second voltage E2 to the actuator 101*d* such that the valve portion 104 is moved to the second position P2 to completely close the discharge orifice 105. Subsequently, the controller 120 applies the first voltage E1 to the actuator 101*d* such that the valve portion 104 is moved from the second position P2 to the first position P1 to completely open the discharge orifice 105. The liquid 200 is discharged from the discharge orifice 105 in this completely open state. The movement of the valve portion 104 from the second position P2 to the first position P1 corresponds to the first movement M1.

After time t1 [sec] has elapsed since the liquid 200 started to be discharged, the controller 120 applies the second voltage E2 to the actuator 101*d* over the application period Δt which is shorter than the predetermined period Δt0. Subsequently, the controller 120 applies the first voltage E1 to the actuator 101*d*. As a result, the valve portion 104 is moved back toward the first position P1 at the third position P3 before it reaches the second position P2 so that the valve portion 104 subsequently arrives at the first position P1. Since the discharge orifice 105 is not closed during this time, the liquid 200 continues to be discharged.

When time t1 has further elapsed after the predetermined period Δt0, the controller 120 applies the second voltage E2 to the actuator 101*d*. Subsequently, after the application period Δt which is shorter than the predetermined period Δt0 has elapsed, the controller 120 applies the first voltage E1 to the actuator 101*d*. As a result, the valve portion 104 is moved back toward the first position P1 at the third position P3 before it reaches the second position P2 so that the valve portion 104 subsequently arrives at the first position P1. Since the discharge orifice 105 is not closed during this time, the liquid 200 continues to be discharged.

Thereafter, in a similar manner, the controller 120 can repetitively perform this operation of applying the second voltage E2 to the actuator 101*d* after time t1 has further elapsed after the predetermined period Δt0, and subsequently applying the first voltage E1 to the actuator 101*d* after the application period Δt. This repetitive performance of the aforementioned operation allows the head 100*d* to discharge the liquid 200 while reciprocating the valve portion 104 back and forth between the first position P1 and the third position P3. As a result, a pressure fluctuation is generated in the liquid 200 in the liquid chamber 106, thus stirring the liquid 200.

When the discharge operation is to be stopped, the controller 120 applies the second voltage E2 to the actuator 101*d* to close the discharge orifice 105.

Although it may depend on the structure of the head or the type of the actuator, the length of the period after the application of the second voltage E2 up to the application of the first voltage E1 before the elapse of the predetermined period Δt0, in other words, the length of the application period Δt for moving the valve portion 104 to the third position P3, may preferably be longer than or equal to 5% of the length of the predetermined period Δt0. Hence, it may be preferable for the application period Δt to satisfy $\Delta t0 \times 0.95 \geq \Delta t > 0$.

As described above, the liquid discharge apparatus 1 that can perform a stable discharge operation may be provided by employing the actuator 101*d*.

Modification of Fourth Embodiment

FIG. 17 is a graph illustrating the driving voltage of an actuator 101*e* as the second example of the actuator according to the third embodiment. FIG. 18 is a graph illustrating the second example of the movement of the valve portion 104 in correspondence with the driving voltage.

The actuator 101*e* includes a piezoelectric element operating in the d31 mode.

As illustrated in FIGS. 17 and 18, when the first voltage E1 is applied to the actuator 101*c*, the piezoelectric element contracts in the Y direction, causing the first valve member 103 to move in the −Y direction such that the valve portion 104 is moved away from the discharge orifice 105 to open the discharge orifice 105. In this case, the valve portion 104 is positioned at the first position P1.

When the second voltage E2 that is lower than the first voltage E1 is applied to the actuator 101*e*, the piezoelectric element of the actuator 101*e* expands in the Y direction, causing the first valve member 103 to move in the +Y direction such that the valve portion 104 blocks and closes the discharge orifice 105 to close the discharge orifice 105. In this case, the valve portion 104 is positioned at the second position P2.

The changes in the value of the driving voltage and the changes in the position of the valve portion 104 will be described in time series. First, the controller 120 applies the second voltage E2 to the actuator 101*e* to move the valve portion 104 to the second position P2 to completely close the discharge orifice 105. Thereafter, the controller 120 applies the first voltage E1 to the actuator 101*e*, causing the valve portion 104 to move from the second position P2 to the first position P1 to completely open the discharge orifice 105. The liquid 200 is discharged from the discharge orifice 105 in this completely open state. The movement of the valve portion 104 from the second position P2 to the first position P1 corresponds to the first movement M1.

After time t1 [sec] has elapsed since the liquid 200 started to be discharged, the controller 120 applies the second voltage E2 to the actuator 101*e*. Subsequently, after the application period Δt which is shorter than the predetermined period Δt0 has elapsed, the controller 120 applies the first voltage E1 to the actuator 101*c*. As a result, the valve portion 104 is moved back toward the first position P1 at the third position P3 before it reaches the second position P2 so that the valve portion 104 subsequently arrives at the first position P1. Since the discharge orifice 105 is not closed during this time, the liquid 200 continues to be discharged.

When time t1 has further elapsed after the predetermined period Δt0, the controller 120 applies the second voltage E2 to the actuator 101*e*. Subsequently, after the application period Δt which is shorter than the predetermined period Δt0 has elapsed, the controller 120 applies the first voltage E1 to the actuator 101*e*. As a result, the valve portion 104 is moved back toward the first position P1 at the third position P3 before it reaches the second position P2 so that the valve portion 104 subsequently arrives at the first position P1. Since the discharge orifice 105 is not closed during this time, the liquid 200 continues to be discharged.

Thereafter, in a similar manner, the controller 120 can repetitively perform this operation of applying the second voltage E2 to the actuator 101*e* after time t1 has further elapsed after the predetermined period Δt0, and subsequently applying the first voltage E1 to the actuator 101*e* after the application period Δt which is shorter than the predetermined period Δt0 has elapsed. This repetitive performance of the aforementioned operation allows a head 100*e* to discharge the liquid 200 while reciprocating the valve portion 104 back and forth between the first position P1 and the third position P3. As a result, a pressure fluctuation is generated in the liquid 200 in the liquid chamber 106, thus stirring the liquid 200.

When the discharge operation is to be stopped, the controller 120 applies the second voltage E2 to the actuator 101*e* to close the discharge orifice 105.

Although it may depend on the structure of the head, the type of the actuator, and the like, the length of the application period Δt may preferably be longer than or equal to 5% of length of the predetermined period Δt0. Hence, it may be preferable for the application period Δt to satisfy $\Delta t0 \times 0.95 \geq \Delta t > 0$.

Fifth Embodiment

A liquid discharge apparatus 1*f* according to the fifth embodiment will be described. The actuator 101*d* according to the third embodiment or the actuator 101*e* according to the fourth embodiment may be used as the actuator of the liquid discharge apparatus 1*f*.

FIG. 19 is a block diagram illustrating an example of the functional arrangement of a controller 120*f* included in the liquid discharge apparatus 1*f*. As illustrated in FIG. 19, the controller 120*f* includes a first time modifier 128 and a second time modifier 129. These functions may be implemented by an electrical circuit. Alternatively, some of these functions may be implemented by software. Furthermore, these functions may be implemented by a plurality of circuits or a plurality of pieces of software.

The controller 120*f* applies the first voltage E1 or the second voltage E2 to the actuator 101*d* to move the valve portion 104 to the third position P3 at the application period Δt which is shorter than the predetermined period Δt0.

The first time modifier 128 is an example of a first time modifying unit that modifies the application period Δt in accordance with the temperature of the actuator 101*d* detected by the temperature sensor 130.

The second time modifier 129 is an example of a second time modifying unit that modifies the application period Δt in accordance with the number of the first movements M1 performed by the actuator 101*d* and counted by the movement counter 126.

The amount of movement of the first valve member 103 with respect to the driving voltage per unit voltage may change depending on the temperature of the actuator 101*d*. In addition, if the number of the first movements M1 by the actuator 101*d* increases, the amount of movement of the first valve member 103 with respect to the driving voltage per unit voltage may decrease.

The controller 120*f* causes the first time modifier 128 to modify the application period Δt in accordance with the temperature of the actuator 101*d*. In addition, the controller 120*f* causes the second time modifier 129 to modify the application period Δt in accordance with the number of the first movements M1 by the actuator 101*d*. This allows the amount by which the discharge orifice 105 is opened in accordance driving voltage to be approximately constant, thereby stabilizing the discharge amount. Other effects are similar to those of the first embodiments.

Sixth Embodiment

The arrangement of a liquid discharge apparatus according to the sixth embodiment will be described with reference to FIGS. 20 and 21. FIG. 20 is a view illustrating an example of the arrangement of the liquid discharge apparatus according to the sixth embodiment. FIG. 21 is an enlarged view of the area A in FIG. 20.

As illustrated in FIG. 20, the liquid discharge apparatus according to the sixth embodiment includes the head 100, the liquid supplying unit 110, an elastic film 340, and a vibration source 330. The elastic film 340 is arranged on a first liquid channel 320 for supplying the liquid from the liquid supplying unit 110 to the head 100. The vibration source 330 can cause the elastic film 340 to oscillate.

The liquid discharge apparatus according to the sixth embodiment causes the liquid supplying unit 110 to supply the liquid 200 to the head 100 and causes the controller to control the head 100 to discharge the liquid 200 from the head 100. Note that a perspective of the interior of the head 100 is illustrated in FIG. 20.

As illustrated in FIGS. 20 and 21, the head 100 includes the actuators 101, the first valve members 103, and the liquid chambers 106.

Each actuator 101 includes a piezoelectric element that contracts in accordance with the applied voltage. In the embodiment, the piezoelectric element may be a (vertical displacement type) piezoelectric element which operates in the d33 mode, and may expand and contract in the Y direction in accordance with the applied voltage. The material of the piezoelectric element may be, for example, lead zirconate titanate (PZT). The piezoelectric element according to the embodiment may be a stacked piezoelectric element in which a plurality of piezoelectric elements have been stacked in the Y direction to increase the amount of displacement accompanying the expansion and contraction.

The end on the −Y side of each actuator 101 is coupled and fixed to the frame 102, and the end on the +Y side of each actuator 101 is coupled to the end on the −Y side of the corresponding first valve member 103. The actuator 101 is an example of a moving unit in which a piezoelectric element expands and contracts in accordance with the applied voltage to move the first valve member 103. In the embodiment, the actuator 101 moves the first valve member 103 in the Y direction.

The head 100 includes the plurality of liquid chambers 106 arrayed in the X direction. Each of the plurality of liquid chambers 106 includes the discharge orifice 105. The discharge orifice 105 is a through hole for discharging the liquid 200 and is formed on the discharge orifice plate 109 which forms the wall on the +Y side of the liquid chamber 106. The liquid chamber 106 stores the liquid 200 inside, and the liquid 200 is discharged from the inside of the liquid chamber 106 to the outside through the discharge orifice 105.

The liquid 200 according to the embodiment may be one of, for example, a liquid whose viscosity is higher than 10 mPa·s, a liquid whose thixotropic index which indicates the structural viscosity is higher than 1.3, a liquid whose solids content is higher than 20 wt %, or a liquid containing particles whose particle size is larger than 5 μm. Particles which may be contained in the liquid 200 may be particles to be used as electrode materials, and may be, for example, carbon which can be used as an anode active material, lithium transition metal oxides which can be used as cathode active materials, or ceramics which are used to form a functional layer to impart a function to the electrode.

Each first valve member 103 is provided such that the +Y-side portion of the first valve member 103 is contained in the corresponding liquid chamber 106. The first valve members 103 include metal materials and the like, and may include a plurality of needle-like members extending in the Y direction.

Each of the plurality of the first valve members 103 is paired with a corresponding one of the plurality of the liquid chamber 106. The +Y-side portion of each first valve member 103 is inserted in the corresponding liquid chamber 106 and is movable in the Y direction. A gap formed between the first valve member 103 and the inner wall of the liquid chamber 106 in the liquid chamber 106 forms the individual liquid channel 108 where the liquid 200 flows.

The end, which is on the side of the discharge orifice 105, of the first valve member 103 forms the valve portion 104 for opening and closing the discharge orifice 105. The actuator 101 can move the first valve member 103 in the Y direction in accordance with the applied voltage to set a state in which the discharge orifice 105 is open or a state in which the discharge orifice 105 is closed.

More specifically, when the piezoelectric element of the actuator 101 contracts in the Y direction in accordance with the applied voltage, the first valve member 103 is moved to the −Y side such that the valve portion 104 is moved away from the discharge orifice 105, thus setting a state in which the discharge orifice is open. When the piezoelectric element of the actuator 101 expands in the Y direction in accordance with the applied voltage, the first valve member 103 is moved to the +Y side such that the valve portion 104 blocks the discharge orifice 105, thus setting a state in which the discharge orifice is closed.

A first pressurizing unit 300 and the liquid reservoir 111 are an example of supplying units for supplying the pressurized liquid 200 to the liquid chamber 106. The liquid 200 pressurized by the first pressurizing unit 300 is supplied to the plurality of liquid chambers 106 via the manifold 107.

Since the liquid 200 is pressurized by the first pressurizing unit 300, the liquid 200 is discharged outside through the discharge orifice 105 when the discharge orifice 105 is opened by the valve portion 104. When the discharge orifice 105 is closed by the valve portion 104, it sets a no-discharge state in which the liquid 200 is not discharged.

In this embodiment, the actuator 101 is exemplified by an actuator which includes a piezoelectric element. However, the actuator 101 is not limited to this. The actuator 101 may include, for example, at least one of an electromagnet that generates a magnetic field in accordance with the applied voltage, an air cylinder that converts compressed air energy into linear motion in accordance with the applied voltage, a motor actuator that is driven in accordance with the applied voltage, or a hydraulic mechanism that generates a hydraulic pressure in accordance with the applied voltage. Effects similar to the effects of a case using a piezoelectric element can be obtained even in a case where these components are used.

Alternatively, the head 100 may include the actuators 101 which include piezoelectric elements operating in the d31 mode. Each actuator 101 may include, for example, a hollow nozzle body which has, on its distal end, a discharge orifice for discharging liquid and has an inlet for injecting liquid in the vicinity of the discharge orifice, a piezoelectric element which is incorporated in the nozzle body and expands and contracts in accordance with the application of a voltage from the outside, a valve member for opening and closing the discharge orifice, a reverse spring mechanism which is provided between the valve member and the piezoelectric element, a scaling member which is fitted onto the valve member and prevents ink from flowing into the side of the piezoelectric element, and a pair of lead wires which are connected to an electrode of the piezoelectric element and to which a voltage can be applied.

The elastic film 340 can be pushed and pulled by the vibration source 330. The clastic film 340 is provided on the first liquid channel 320, which supplies the liquid in the liquid reservoir 111 to the head 100, so as to be in contact with the liquid in the first liquid channel 320. By vibrating the vibration source 330 to cause a pressure fluctuation in the liquid to be supplied to the head 100, a pressure fluctuation is generated in the liquid in the head 100, particularly, in the liquid in each liquid chamber 106. This pressure fluctuation in the liquid results in the stirring of the liquid.

In particular, vibrating the vibration source while the valve is open and the liquid is being discharged from the nozzle hole may allow the liquid to be continuously discharged even if the discharge operation is performed in a state in which the valve is left open. In the viewpoint of achieving favorable effects in regard to the pressure fluctuation and the stirring, it is preferable for the vibration source to vibrate repetitively. In addition, the stirring by the vibration of the vibration source may be performed when the nozzle hole is open or closed. However, by repetitively vibrating the vibration source while the nozzle hole is open, a pressure fluctuation can be generated in a pulsating manner near the nozzle hole while the liquid is being discharged. Hence, it may be possible to suppress the flow of the liquid from stagnating and to stir the liquid in a direction in which the liquid is to be pushed out from the nozzle hole. Therefore, the liquid can be stirred more favorably than a case where the pressure fluctuation is generated in a state in which the valve is closed. Note that although the vibrating of the vibration source may be periodic or aperiodic, it may be preferable for the vibration source to vibrate at a frequency of 100 Hz or more.

Note that as a modification of the sixth embodiment, the liquid supplying tube itself may be made of an elastic member and be pressed by the vibration source instead of using the elastic film (for example, see Japanese Unexamined Patent Application Publication No. 2018-94736).

Seventh Embodiment

FIG. 22 is a view illustrating an example of the arrangement of a liquid discharge apparatus according to the seventh embodiment. Since the arrangement of the head 100 is similar to that of the sixth embodiment, a description will be omitted. The liquid discharge apparatus according to the seventh embodiment includes a first liquid supply opening 400 on the upstream side where the liquid is supplied and a second liquid supply opening 410 on the downstream side. The first liquid supply opening 400 communicates with the second liquid supply opening 410 to allow the liquid to flow inside the head 100.

The second liquid supply opening 410 is connected to the second liquid channel 420. The seventh embodiment differs from the sixth embodiment in that the elastic film 340 is provided to be in contact with the liquid in the second liquid channel 420. In the seventh embodiment, this arrangement can prevent a malfunction in which the liquid stops being supplied to the head 100 due to the liquid supply channel being blocked when the elastic film 340 is pushed in.

Eighth Embodiment

FIG. 23 is a view illustrating an example of the arrangement of a liquid discharge apparatus according to the eighth embodiment. Since the arrangement of the head 100 is similar to that of the sixth embodiment, a description will be omitted.

In this embodiment, a vibration source 500 is provided on the first liquid channel 320 that supplies the liquid from the liquid reservoir 111 to the head 100. The vibration source 500 causes the first liquid channel 320 to vibrate by shaking or bouncing the first liquid channel 320. This causes the liquid pressure in the liquid pipe to fluctuate, thereby generating a pressure fluctuation in the liquid in each liquid chamber 106 of the head 100 to stir the liquid.

Ninth Embodiment

FIG. 24 is a view illustrating an example of the arrangement of the liquid discharge apparatus according to the ninth embodiment. Since the arrangement of the head 100 is similar to that of the sixth embodiment, a description will be omitted.

The liquid discharge apparatus according to the ninth embodiment includes, in addition to the first pressurizing unit 300 for pressurizing the liquid to be supplied to the head 100, a second pressurizing unit 600 for discharging the liquid. The magnitude of the pressurizing force of the second pressurizing unit 600 differs from the magnitude of the pressurizing force of the first pressurizing unit 300. That is, the pressurizing force of the second pressurizing unit 600 may be larger or smaller than the pressurizing force of the first pressurizing unit 300. The second pressurizing unit 600 is connected to the liquid reservoir 111 via a second valve member 610.

The second valve member 610 is provided on the channel between the second pressurizing unit 600 and the liquid reservoir 111 and can open and close the channel. The second valve member 610 may be, for example, a solenoid valve that is driven in accordance with a control signal to open and close the channel between the second pressurizing unit 600 and the liquid reservoir 111.

In this embodiment, opening and closing the second valve member 610 causes a pressure fluctuation in the liquid supplied to the head 100, thereby causing a pressure fluctuation in the liquid in each liquid chamber 106 of the head 100 to stir the liquid. Note that the opening and closing of the second valve member 610 refers to an operation performed to change the state in which the liquid flows in the channel between the second pressurizing unit 600 and the liquid reservoir 111. The opening and closing of the second valve member 610 includes, in addition to an operation of switching between a state in which the liquid flows in the channel between the second pressurizing unit 600 and the liquid reservoir 111 and a state in which the liquid docs not flow in the channel between the second pressurizing unit 600 and the liquid reservoir 111, an operation of changing the amount of liquid flowing in the channel or the rate at which the liquid flows in the channel based on the difference between the open state and the closed state of the second valve member 610.

Tenth Embodiment

A coating apparatus 1001 according to the tenth embodiment will be described with reference to FIGS. 25 to 27. FIG. 25 is a view illustrating an example of the arrangement of the coating apparatus 1001. FIG. 26 is a view illustrating the first example of the arrangement of the coating apparatus 1001 with respect to a target object U. FIG. 27 is a view illustrating the second example of the arrangement of the coating apparatus 1001 with respect to the target object U.

The coating apparatus 1001 includes a liquid discharge apparatus 1*g*, a camera 1004 as an image capturing means arranged near the liquid discharge apparatus 1*g*, an X-Y table 1003 for moving the liquid discharge apparatus 1*g* and the camera 1004 in the X direction and the Y direction, image editing software S for editing an image captured by the camera 1004, and a controller 120*g*. Based on a predetermined control program, the controller 120*f* causes the X-Y table 1003 to operate and causes the liquid discharge apparatus 1*g* to discharge the liquid 200.

The coating apparatus 1001 can apply the liquid 200, which is discharged from the liquid discharge apparatus 1*g*, onto the target object U.

The liquid discharge apparatus 1*g* discharges the liquid 200 from the plurality of discharge orifices 105 toward an application surface of the target object U. The liquid 200 discharged from each discharge orifice 105 is discharged in a direction which is approximately perpendicular to the X-Y plane. The respective directions in which the liquid 200 is discharged from the plurality of discharge orifices 105 are approximately parallel to each other. The distance between each discharge orifice 105 and the application surface of the target object U is, for example, approximately 20 cm.

The X-Y table 1003 includes an X-axis shaft 1005 which includes a linear movement mechanism and a Y-axis shaft 1006 which holds the X-axis shaft 1005 by two arms and moves the X-axis shaft 1005 in the Y direction. The liquid discharge apparatus 1*g* and the camera 1004 are attached to a slider. A shaft 1007 is arranged on the Y-axis shaft 1006. The robot arm 1008 holds this shaft 1007 to allow the liquid discharge apparatus 1*g* to be freely arranged with respect to the target object U.

For example, in a case where the target object U is an automobile, the liquid discharge apparatus 1*g* can be arranged above the target object U as illustrated in FIG. 26 or be arranged on a position at the side of the target object U as illustrated in FIG. 27. Note that the controller 120*g* controls the operation of the robot arm 1008 based on a predetermined program.

The camera 1004 is arranged on the slider of the X-axis shaft 1005 near the liquid discharge apparatus 1*g*, and captures a predetermined range of the application surface of the target object U at small constant intervals while moving in the X-Y direction. The camera 1004 may be, for example, a digital camera. In the camera 1004, appropriate specifications for capturing a plurality of finely divided images, which are acquired by dividing the predetermined range of the application surface, are selected for the lens, the resolution, or the like. The plurality of finely divided images of the application surface are continuously and automatically captured by the camera 1004 in accordance with a program preinstalled in the controller 120*g*.

As described above, including the liquid discharge apparatus 1*g* allows the coating apparatus 1001 to apply the liquid 200 onto a desired position on the target object U accurately, even in a case where there is a long distance between the target object U and the discharge orifices 105. Since the liquid discharge apparatus 1*g* can also discharge the liquid 200 stably, the coating apparatus 1001 can apply the liquid 200 onto the target object U accurately.

The particles contained in the liquid 200 discharged by the coating apparatus 1001 may be, for example, aluminum flakes, mica, titanium oxide, or the like. Among these, there is a concern that the aluminum flakes may cause the sealing performance to degrade by piercing the packing of the valve portion 104. Employing this embodiment, however, can reduce the operation in which the valve portion 104 is pressed against the discharge orifice plate 109, thus allowing the degradation of the scaling performance to be suppressed.

Although the embodiments have been described above, the present disclosure is not limited to the specific embodiments disclosed above, and various modifications and changes can be implemented without departing from the scope of the claims. For example, the present disclosure is also applicable to an arrangement in which the liquid chamber 106 is not present for each nozzle and the manifold 107 is present immediately above the discharge orifices 105. A head including the liquid chamber 106 which branches from the manifold 107 to extend to the discharge orifices may be less susceptible to a state in which an increase in the flow rate of the liquid in a common channel causes the discharge direction of the discharged liquid to bend greatly, but may be more susceptible to discharge failures due to clogging caused by liquid. The present disclosure is particularly suitable for such a head.

The liquid discharge apparatus according to the embodiments is not limited to an electrode printing apparatus or a coating apparatus, and may be an image forming apparatus that forms an image on a recording medium such as a paper sheet or the like.

The embodiments may also include a liquid discharge method. The liquid discharge method may be, for example, a liquid discharge method performed by a liquid discharge apparatus that includes a liquid chamber which includes a discharge orifice, a supplying unit configured to supply a pressurized liquid to the liquid chamber, a valve member which is provided in the liquid chamber and includes a valve portion configured to open and close the discharge orifice, and a moving unit configured to move the valve member, wherein the liquid discharge apparatus causes a control unit to control the movement of the valve member by the moving unit, wherein the movement of the valve member includes a first movement in which the valve portion is moved from a second position to a first position and a second movement in which the valve portion is reciprocated back and forth between the first position and a third position, and wherein the first position is a position where the discharge orifice is opened by the valve portion, the second position is a position where the discharge orifice is closed by the valve portion, and the third position is a position between the first position and the second position. Effects similar to those of the above-described liquid discharge apparatus can obtained by such a liquid discharge method.

(Method of Manufacturing Electrode)

The embodiments may include a method of manufacturing an electrode and an electrochemical device. A method of manufacturing an electrode will be described below. FIG. 28 is a schematic view illustrating an example of an electrode manufacturing apparatus for implementing the method of manufacturing an electrode according to the embodiments. The electrode manufacturing apparatus is an apparatus that uses the above-described liquid discharge apparatus to discharge a liquid composition to manufacture an electrode which has a layer containing an electrode material.

<Unit for Forming Layer Containing Electrode Material and Process of Forming Layer Containing Electrode Material>

The discharge unit is the liquid discharge apparatus described above. By executing a discharge, a liquid composition can be applied onto a target object to form a liquid composition layer. As long as the target object (to be also referred to as a "discharge target object" hereinafter) is a target for forming a layer containing an electrode material, the target object is not particularly limited and may be selected appropriately in accordance with the purpose. The target object may be, for example, an electrode substrate (collector), an active material layer, a layer containing a solid-state electrode material, or the like. Further, as long as the discharge unit and the discharge process are capable of forming a layer containing an electrode material on a discharge target object, the discharge unit and the discharge process may be arranged to directly discharge a liquid composition to form the layer containing the electrode material or arranged to indirectly discharge the liquid composition to form the layer containing the electrode material.

<Other Arrangements and Other Processes>

Other arrangements in an apparatus for manufacturing an electrode composition layer can be selected suitably in accordance with the purpose, and are not particularly limited as long as the effects of the present disclosure are not lost. For example, another arrangement in the apparatus may be a heating unit or the like. Other processes for a method of manufacturing the electrode composition layer can be selected suitably in accordance with the purpose, and are not particularly limited as long as the effects of the present disclosure are not lost. For example, another process may be a heating process.

<Heating Unit and Heating Process>

The heating unit is a unit configured to heat the liquid composition discharged from the discharge unit. The heating process is a process of heating the liquid composition discharged in the discharge process. A liquid composition layer can be dried by the heating process.

<Arrangement for Directly Discharging Liquid Composition to Form Layer Containing Electrode Material>

An electrode manufacturing method for forming an electrode composition layer containing an active material on an electrode substrate (collector) will be described as an example of the method of manufacturing an electrode. The apparatus for the electrode composition layer includes a discharge process unit 110*g* which is configured to perform a process for applying a liquid composition on a base material 4*g* to be printed which, includes a discharge target object, to form a liquid composition layer on the base material, and a heating process unit 130*g* configured to perform a heating process for heating the liquid composition layer to obtain an electrode composition layer. The apparatus for manufacturing the electrode composition layer includes a conveyance unit 5 configured to convey the base material 4*g* to be printed. The conveyance unit 5 conveys the base material 4*g* to be printed to the discharge process unit 110*g* and the heating process unit 130*g* in this order at a speed that has been preset. The method of manufacturing the base material 4*g* to be printed which includes the discharge target object, such as the active material layer, is not particularly limited, and a known method can be suitably selected. The discharge process unit 110*g* includes a printing device 281*a* of the present disclosure for implementing an application process of applying the liquid composition on the base material 4*g* to be printed, a container 281*b* for storing the liquid composition, and a supply tube 281*c* for supplying the liquid composition stored in the container 281*b* to the printing device 281*a*.

The container 281*b* stores the liquid composition. The discharge process unit 110*g* discharges a liquid composition 7 from the printing device 281*a* to apply the liquid composition 7 onto the base material 4*g* to be printed to form a thin film of a liquid composition layer on the base material to be printed. Note that the container 281*b* may be integrated with the apparatus for manufacturing the electrode composition layer or may be detachable from the apparatus for manufacturing the electrode composition layer.

The container 281*b* and the supply tube 281*c* can be selected arbitrarily as long as they can stably store and supply the liquid composition 7.

As illustrated in FIG. 28, the heating process unit 130*g* includes a heating device 3*a* and is configured to perform a solution removal process executed by using the heating device 3*a* to heat and dry a solution remaining the liquid composition layer to remove the solution. The electrode composition layer is formed as a result. The heating process unit 130*g* may perform the solution removal process under a decompressed state.

The heating device 3*a* is not limited to a particular device, and can be selected suitably in accordance with the purpose. The heating device 3*a* may be, for example, a substrate heater, an infrared heater, hot air heater, or a combination of these devices. The heating temperature and the time can be appropriately selected in accordance with the boiling point of the solution included in the liquid composition 7 and the film thickness to be formed.

FIG. 29 is a schematic view illustrating another example of an electrode manufacturing apparatus (liquid discharge apparatus) for implementing the method of manufacturing the electrode composition layer according to the embodiments. A liquid discharge apparatus 300' can control a pump 310, valves 311 and 312 to cause the liquid composition to circulate through a liquid discharge head 306, a tank 307, and the tube 308. An external tank 313 is also provided with the liquid discharge apparatus 300'. When the liquid composition within the tank 307 has decreased, the pump 310, the valve 311, the valve 312, and a valve 314 can be controlled to supply the liquid composition from the external tank 313 to the tank 307. Using the apparatus for manufacturing the electrode composition layer allows the liquid discharge composition to be discharged to a desired spot on the discharge target object. For example, the electrode composition layer can be suitably used as a component of an electrochemical device. Components of the electrochemical device other than the electrode composition layer are not particularly limited, and known components can be appropriately selected. The components may be, for example, an anode, a cathode, a separator, and the like.

FIG. 30 illustrates an example of a method of manufacturing an electrode according to an embodiment. The method of manufacturing an electrode 210 includes a process of using the liquid discharge apparatus 300' of the present disclosure to sequentially discharge a liquid composition 12A on an electrode substrate 211.

A long and narrow electrode substrate 211 is prepared first. The electrode substrate 211 is wound around a tube-shaped core and set on an unwinding roller 304 and a rewinding roller 305 so that the side on which an electrode composition layer 212 is to be formed may be on the upper side in FIG. 30. The unwinding roller 304 and the rewinding roller 305 are rotated anti-clockwise so that the electrode substrate 211 may be conveyed in a right to left direction in FIG. 30. Subsequently, in a similar manner to FIG. 28, the liquid discharge head 306, which is arranged on the upstream side of the electrode substrate 211 laid across the unwinding roller 304 and the rewinding roller 305, discharges droplets of the liquid composition 12A onto the electrode substrate 211 which is being sequentially conveyed.

Note that multiple liquid discharge heads 306 may be installed in a direction approximately parallel or approximately perpendicular to the conveyance direction of the electrode substrate 211. Next, the electrode substrate 211 to which the droplets of the liquid composition 12A have been discharged is conveyed to a heating mechanism 309 by the unwinding roller 304 and the rewinding roller 305. As a result, the electrode composition layer 212 is formed, thereby obtaining the electrode 210. Subsequently, the electrode 210 is cut into a desired size by punching or the like.

The heating mechanism 309 may be provided above or below the electrode substrate 211. Alternatively, multiple heating mechanisms 309 may also be installed.

The heating mechanism 309 is not limited to a particular device, as long as it does not directly contact the liquid composition 12A. The heating mechanism 309 may be, for example, a resistance furnace, an infrared heater, a fan heater, or the like. Note that a plurality of heating mechanisms 309 may be provided. An ultraviolet curing device may be provided for polymerization.

It also is preferable for the liquid composition 12A that has been discharged onto the electrode substrate 211 to be heated. When heating, the heating may be performed by a stage or a heating mechanism other than a stage. The heating mechanism may be provided above or below the electrode substrate 211. Alternatively, multiple heating mechanisms may also be provided.

The heating temperature is not particularly limited. An anode composition layer is formed when the liquid composition 12A is dried by the heating. That said, in a case where the liquid composition 12A contains a binder precursor, it is preferable for the heating temperature to be a temperature that allows the binder precursor to polymerize, and may preferably fall in a range of 70° to 150° in the viewpoint of the energy to be used. In addition, when heating the liquid composition 12A discharged on the electrode substrate 211, the liquid composition 12A may be irradiated with ultraviolet rays.

Furthermore, as illustrated in FIG. 31, a tank 307A may supply the liquid composition from a tank 313A coupled to the tank 307A, and the liquid discharge head 306 may include a plurality of liquid discharge heads 306A and 306B.

<Arrangement of Directly Discharging Liquid Composition to Form Layer Containing Electrode Material>

FIGS. 32A and 32B are views each illustrating an example of a printing unit employing a transfer printing method. FIG. 32A illustrates a printing unit that uses an intermediate transfer drum, and FIG. 24B illustrates a printing unit that uses an endless intermediate transfer belt.

A printing unit 400' illustrated in FIG. 32A is an inkjet printer that forms a functional layer on a base material by transferring a liquid composition onto the base material via an intermediate transfer member 4001.

The printing unit 400' includes an inkjet unit 420', a transfer drum 4000, a pre-processing unit 4002, an absorbing unit 4003, a heating unit 4004, and a cleaning unit 4005.

The inkjet unit 420' includes a head module 422 that holds a plurality of heads 1011. The heads 1011 discharge liquid ink onto the intermediate transfer member 4001 supported by the transfer drum 4000 to form an ink layer on the intermediate transfer member 4001. Each head 1011 is a line printhead on which nozzles are arranged in a range covering the width of the printing area of the largest base material that can be used. Each head 1011 includes, on its lower surface, a nozzle face with nozzles formed therein. The nozzle face faces the surface of the intermediate transfer member 4001 with a minute gap therebetween. Since the intermediate transfer member 4001 is arranged to move along a circular orbit in the case of this embodiment, the plurality of heads 1011 are arranged radially.

The transfer drum 4000 faces an impression cylinder 621 and forms a transfer nip portion. The pre-processing unit 4002 applies a reaction liquid on the intermediate transfer member 4001 to increase the viscosity of the ink before the ink discharge operation by the heads 1011. The absorbing unit 4003 absorbs a liquid component from the ink layer on the intermediate transfer member 4001 before the transfer. The heating unit 4004 heats the ink layer on the intermediate transfer member 4001 before the transfer. Heating the ink layer will melt the resin in the ink layer and improve transferability onto the base material. The cleaning unit 4005 cleans the surface of the intermediate transfer member 4001 after the transfer to remove remaining ink and debris such as dust on the intermediate transfer member 4001.

The outer peripheral surface of the impression cylinder 621 is pressed against the intermediate transfer member 4001, and the ink layer on the intermediate transfer member 4001 is transferred onto the base material when the base material passes through the transfer nip portion between the impression cylinder 621 and the intermediate transfer member 4001. Note that at least one grip mechanism that can hold the leading-edge portion of the base material may be arranged on the outer peripheral surface of the impression cylinder 621.

A printing unit 400" illustrated in FIG. 32B is an inkjet printer that forms a functional layer on the surface of a base material by transferring a liquid composition onto the base material via an intermediate transfer belt 4006.

The printing unit 400" discharges ink droplets from the plurality of heads 1011, which are arranged in the inkjet unit 420', to form an ink layer on the outer peripheral surface of the intermediate transfer belt 4006. The ink layer formed on the intermediate transfer belt 4006 is dried by a drying unit 4007, and the ink layer becomes a film on the intermediate transfer belt 4006.

The ink layer that has become a film on the intermediate transfer belt 4006 is transferred to the base material at the transfer nip portion where the intermediate transfer belt 4006 faces a transfer roller 622. A cleaning roller 4008 cleans the surface of the intermediate transfer belt 4006 after the transfer.

The intermediate transfer belt 4006 is wound around a driving roller 4009*a*, an opposing roller 4009*b*, a plurality of (four in this example) shape maintenance rollers 4009*c*, 4009*d*, 4009*c*, and 4009*f*, and a plurality of (four in this example) support rollers 4009*g*, and moves in the direction indicated by arrows in FIG. 32B. The support rollers 4009*g* which are disposed to face the head 1011 maintain the tension of the intermediate transfer belt 4006 when ink droplets are to be discharged from the liquid discharge head 1011.

<Method of Manufacturing Electrochemical Device>

A method of manufacturing an electrochemical device, the method including: discharging liquid by a liquid discharge apparatus that includes a liquid chamber which includes a discharge orifice, a supplying unit configured to supply a pressurized liquid containing an electrode material to the liquid chamber, a valve member which is provided in the liquid chamber and includes a valve portion configured to open and close the discharge orifice, a moving unit configured to move the valve member, and a controlling unit configured to control the movement of the valve portion by the moving unit, wherein the movement of the valve member includes a first movement in which the valve portion is moved from a second position to a first position and a second movement in which the valve portion is reciprocated back and forth between the first position and a third position, wherein the first position is a position where the discharge orifice is opened by the valve portion, the second position is a position where the discharge orifice is closed by the valve portion, and the third position is a position between the first position and the second position, and wherein the liquid discharge apparatus discharges the liquid containing the electrode material onto an electrode substrate in the liquid discharging. Effects similar to those of the above-described liquid discharge apparatus can be obtained by such a method of manufacturing an electrochemical device.

Furthermore, the method of manufacturing an electrochemical device may also include processes for manufacturing an electrochemical device such as a base material processing process for processing an electrode for cell assembly.

<Base Material Processing Unit>

A base material processing unit processes, at a stage further downstream from the printing unit 400', a base material W with a functional film formed thereon. The base material processing unit may perform at least one of cutting, folding, or bonding. The base material processing unit can, for example, cut the base material W to fabricate a base material stack. The base material processing unit can wind or stack the base material W. If the insulating layer contains a material which has a melting point or a glass-transition temperature, at least a part of one base material stack may be adhered to another base material stack by heating in the base material processing unit.

The base material processing unit includes, for example, a base material processing device. Cutting of the base material W, Z-folding, stacking, or winding of the base material W, thermal bonding the base materials after the stacking or winding, and the like are performed by the base material processing unit in accordance with the desired form of battery. When the base material processing unit is to process the base material, the conveyance speed of the electrode substrate may be set to a relatively low speed to reduce damage such as wrinkling of the processed base material.

A base material processing process performed by the base material processing unit is, for example, a process for processing the base material W, which has the functional film formed thereon, downstream of the printing unit 400'. The base material processing process may include at least one of a cutting process, a folding process, or a bonding process.

Numbers such as ordinal numbers, quantities, and the like used in the description of the embodiments are merely examples for illustrating the techniques of this disclosure in detail, and the disclosure is not limited to the exemplified numbers. The relationships of connections between the components are exemplified to provide a detailed illustration of the techniques of the disclosure, and the relationships of connections for implementing the functions of the present disclosure are not limited to those that are illustrated.

Note that the division of the blocks illustrated in the functional diagrams is merely an example. The plurality of blocks may be implemented as a single block, divided into two or more blocks, and/or some of the functions may be transferred to another block. Furthermore, the functions of a plurality of blocks that have similar functions may be processed by a piece of hardware or software by parallel processing or time-sharing.

Further, the functions of the embodiments described above may also be implemented by one or more processing circuits. Here, it is assumed that "processing circuitry" includes processors programmed to perform each function by software, such as processors implemented in electronic circuits, devices designed to perform each function as described above, such as ASICs (Application Specific Integrated Circuit), DSPs (digital signal processors), FPGAs (field programmable gate arrays), and conventional circuit modules.

The aspects of the present disclosure are, for example, as follows.

<1> A liquid discharge apparatus including: a liquid chamber including a discharge orifice; a supplying unit configured to supply a pressurized liquid to the liquid chamber; a first valve member provided in the liquid chamber and including a valve portion configured to open and close the discharge orifice; a moving unit configured to move the first valve member; and a stirring mechanism configured to stir the pressurized liquid in the liquid chamber.

<2> The liquid discharge apparatus of <1>, wherein the stirring mechanism is configured to stir the liquid in the liquid chamber in a state in which the discharge orifice is open.

<3> The liquid discharge apparatus of <1> or <2>, wherein the stirring mechanism includes a control unit configured to control the movement of the first valve member by the moving unit, wherein the movement of the first valve member includes a first movement in which the valve portion is moved from a second position toward a first position and a second movement in which the valve portion is reciprocated back and forth between the first position and a third position, and wherein the first position is a position where the discharge orifice is opened by the valve portion, the second position is a position where the discharge orifice is closed by the valve portion, and the third position is a position between the first position and the second position.

<4> The liquid discharge apparatus of <3>, wherein the moving unit is configured to move the first valve member in accordance with an applied voltage, wherein the control unit is configured to apply a first voltage to the moving unit to move the valve portion to the first position, apply a second voltage to the moving unit to move the valve portion to the second position, and apply a third voltage to move the valve portion to the third position, and wherein the first voltage is lower than the second voltage, and the third voltage is higher than the first voltage but lower than the second voltage.

<5> The liquid discharge apparatus of <4>, wherein $E2>E3\geq(E2-E1)\times0.05+E1$ is satisfied, where E1 is the first voltage, E2 is the second voltage, and E3 is the third voltage.

<6> The liquid discharge apparatus of <3>, wherein the moving unit is configured to move the first valve member in accordance with an applied voltage, wherein the control unit is configured to apply a first voltage to the moving unit to move the valve portion to the first position, apply a second voltage to the moving unit to move the valve portion to the second position, and apply a third voltage to move the valve portion to the third position, and wherein the first voltage is higher than the second voltage and the third voltage is higher than the second voltage but lower than the first voltage.

<7> The liquid discharge apparatus of <6>, wherein $E1\times0.95\geq E3>0$ is satisfied, where E1 is the first voltage and E3 is the third voltage.

<8> The liquid discharge apparatus of any one of <4> to <7>, wherein if the second voltage is higher than the first voltage, the control unit applies the third voltage, which is higher than the first voltage by a predetermined voltage, to the moving unit to perform the second movement, wherein if the first voltage is higher than the second voltage, the control unit applies the third voltage, which is lower than the second voltage by the predetermined voltage, to the moving unit to perform the second movement, and wherein the control unit further includes a first voltage modifier configured to modify the predetermined voltage in accordance with a temperature of the moving unit.

<9> The liquid discharge apparatus of any one of <4> to <8>, further including a second voltage modifier configured to modify the third voltage in accordance with a number of movements performed by the moving unit.

<10> The liquid discharge apparatus of <3>, wherein the moving unit moves the first valve member in accordance with an applied voltage, wherein the control unit applies, to the moving unit over an application period shorter than a predetermined period, a voltage for moving the valve portion to the second position, and wherein the predetermined period is a time taken to move the valve portion to the second position after the voltage for moving the valve portion to the second position has been applied to the moving unit.

<11> The liquid discharge apparatus of <10>, wherein $\Delta t0\times0.95\geq\Delta t>0$ is satisfied, where $\Delta t0$ is the predetermined period and $\Delta t$ is the application period.

<12> The liquid discharge apparatus of <10> or <11>, further including a first time modifier configured to modify the application period in accordance with a temperature of the moving unit.

<13> The liquid discharge apparatus of any one of <10> to <12>, further including a second time modifier configured to modify the application period in accordance with a number of movements performed by the moving unit.

<14> The liquid discharge apparatus of any one of <2> to <13>, wherein the moving unit includes a piezoelectric element configured to contract and expand in accordance with the applied voltage.

<15> The liquid discharge apparatus of any one of <2> to <14>, wherein the liquid is one of a liquid whose viscosity is higher than 10 mPa·s, a liquid whose thixotropic index which indicates structural viscosity is higher than 1.3, a liquid whose solids content is higher than 20 wt %, or a liquid containing particles whose particle size is larger than 5 μm.

<16> The liquid discharge apparatus of any one of <2> to <15>, wherein a reciprocating frequency of the second movement is repeated is higher than or equal to 100 Hz.

<17> The liquid discharge apparatus of any one of <1> to <16>, further including: a first liquid channel and a second liquid channel which are positioned between the supplying unit and the liquid chamber; and a liquid pressure fluctuation unit configured to be able to cause a pressure exerted on a liquid inside at least one of the first liquid channel or the second liquid channel to fluctuate, wherein the stirring mechanism is configured to use the liquid pressure fluctuation unit to cause the pressure exerted on the liquid inside at least one of the first liquid channel or the second liquid channel to fluctuate.

<18> The liquid discharge apparatus of any one of <1> to <17>, further including: a first pressurizing unit and a second pressurizing unit each configured to pressurize the liquid in the supplying unit; and a second valve member provided in a liquid channel between the second pressurizing unit and the supplying unit and configured to be able to open and close the liquid channel, wherein a magnitude of a pressure applied by the first pressurizing unit differs from a magnitude of a pressure applied by the second pressurizing unit, and wherein the stirring mechanism is configured to use the second valve member to open and close the liquid channel between the second pressurizing unit and the supplying unit.

<19> A coating apparatus including the liquid discharge apparatus of any one of <1> to <18>, wherein the coating apparatus applies the liquid discharged from the liquid discharge apparatus onto a substrate.

<20> A liquid discharge method performed by a liquid discharge apparatus including a liquid chamber including a discharge orifice, a supplying unit configured to supply a pressurized liquid to the liquid chamber, a first valve member provided in the liquid chamber and including a valve portion configured to open and close the discharge orifice, a moving unit configured to move the first valve member, and a control unit configured to control the movement of the first valve member by the moving unit, wherein the movement of the first valve member includes a first movement in which the valve portion is moved from a second position toward a first position and a second movement in which the valve portion is reciprocated back and forth between the first position and a third position, and wherein the first position is a position where the discharge orifice is opened by the valve portion, the second position is a position where the discharge orifice is closed by the valve portion, and the third position is a position between the first position and the second position.

<21> A method of manufacturing an electrode, the method including discharging a liquid by a liquid discharge apparatus that includes a liquid chamber including a discharge orifice, a supplying unit configured to supply a pressurized liquid to the liquid chamber, a first valve member provided in the liquid chamber and including a valve portion configured to open and close the discharge orifice, a moving unit configured to move the first valve member, and a control unit configured to control the movement of the first valve member by the moving unit, wherein the movement of the first valve member includes a first movement in which the valve portion is moved from a second position toward a first position and a second movement in which the valve portion is reciprocated back and forth between the first position and a third position, wherein the first position is a position where the discharge orifice is opened by the valve portion, the second position is a position where the discharge orifice is closed by the valve portion, and the third position is a position between the first position and the second position, and wherein in the discharging the liquid, the liquid discharge apparatus discharges a liquid containing an electrode material to form a layer containing the electrode material on a discharge target object.

REFERENCE SIGNS LIST

1 liquid discharge apparatus
100 head
101 actuator
102 frame
103 first valve member
104 valve portion
105 discharge orifice
106 liquid chamber
107 manifold
108 individual liquid channel
109 discharge orifice plate
110 liquid supplying unit
111 liquid reservoir
112 air compressor
113 air tank
114 regulator
120 controller
121 input unit
122 driving voltage generator
123 amplifier
124 output unit
125 first voltage modifier
126 movement counter
127 second voltage modifier
128 first time modifier
129 second time modifier
130 temperature sensor
200 liquid
300 first pressurizing unit
320 first liquid channel
420 second liquid channel
600 second pressurizing unit
610 second valve member
1001 coating apparatus
E1 first voltage
E2 second voltage
E3 third voltage
P1 first position
P2 second position
P3 third position
M1 first movement
M2 second movement
t1, t2 time
Im pattern data
Δt0 predetermined period
Δt application period
U target object

The invention claimed is:

1. A liquid discharge apparatus, comprising:
a liquid chamber including a discharge orifice;
a supplier to supply a pressurized liquid to the liquid chamber;
a first valve to open and close the discharge orifice;
an actuator to move the first valve; and
a stirrer to stir the pressurized liquid in the liquid chamber, wherein:
the stirrer includes control circuitry configured to control movement of the first valve by the actuator,
the movement of the first valve includes a first movement in which a valve component is moved from a second position toward a third position and a second movement in which the valve component is reciprocated back and forth between a first position and the third position, the liquid being continuously discharged during movement of the first valve,
the first position is a position where the discharge orifice is opened by the valve component,
the second position is a position where the discharge orifice is closed by the valve component, and
the third position is a position between the first position and the second position.

2. The liquid discharge apparatus according to claim 1, wherein:
the stirrer is to stir the liquid in the liquid chamber in a state in which the discharge orifice is open.

3. The liquid discharge apparatus according to claim 1, wherein:
the actuator is to move the first valve in accordance with an applied voltage,
the control circuitry is configured to apply a first voltage to the actuator to move the valve component to the first position, apply a second voltage to the actuator to move the valve component to the second position, and apply a third voltage to move the valve component to the third position,
the first voltage is lower than the second voltage, and
the third voltage is higher than the first voltage but lower than the second voltage.

4. The liquid discharge apparatus according to claim 3, wherein:
$E2>E3\geq(E2-E1)\times0.05+E1$ is satisfied, where E1 is the first voltage, E2 is the second voltage, and E3 is the third voltage.

5. The liquid discharge apparatus according to claim 3, wherein:
when the second voltage is higher than the first voltage, the control circuitry applies the third voltage, which is higher than the first voltage by a predetermined voltage, to the actuator to perform the second movement,
when the first voltage is higher than the second voltage, the control circuitry applies the third voltage, which is higher than the second voltage by the predetermined voltage, to the actuator to perform the second movement, and
the control circuitry further includes a first voltage modifier to modify the predetermined voltage in accordance with a temperature of the actuator.

6. The liquid discharge apparatus according to claim 3, further comprising:
a second voltage modifier to modify the third voltage in accordance with a number of movements performed by the actuator.

7. The liquid discharge apparatus according to claim 1, wherein:
the actuator is to move the first valve in accordance with an applied voltage, the control circuitry is to apply a first voltage to the actuator to move the valve component to the first position, apply a second voltage to the actuator to move the valve component to the second position, apply a third voltage to move the valve component to the third position, and the first voltage is higher than the second voltage, and the third voltage is higher than the second voltage but lower than the first voltage.

8. The liquid discharge apparatus according to claim 7, wherein:

$E1 \times 0.95 \geq E3 > 0$ is satisfied, where E1 is the first voltage and E3 is the third voltage.

9. The liquid discharge apparatus according to claim 1, wherein:

the actuator moves the first valve in accordance with an applied voltage, the control circuitry applies, to the actuator over an application period shorter than a predetermined period, a voltage for moving the valve component to the second position, and the predetermined period is a period of time taken to move the valve component to the second position after the voltage for moving the valve component to the second position has been applied to the actuator.

10. The liquid discharge apparatus according to claim 9, wherein:

$\Delta t0 \times 0.95 \geq \Delta t > 0$ is satisfied, where $\Delta t0$ indicates the predetermined period and $\Delta t$ indicates the application period.

11. The liquid discharge apparatus according to claim 9, further comprising:

a first time modifier to modify the application period in accordance with a temperature of the actuator.

12. The liquid discharge apparatus according to claim 9, further comprising:

a second time modifier to modify the application period in accordance with a number of movements performed by the actuator.

13. The liquid discharge apparatus according to claim 1, wherein:

the actuator includes a piezoelectric element to contract and expand in accordance with an applied voltage.

14. The liquid discharge apparatus according to claim 1, wherein:

a reciprocating frequency of the second movement is higher than or equal to 100 Hz.

15. The liquid discharge apparatus according to claim 1, further comprising:

a first liquid channel and a second liquid channel which are positioned between the supplier and the liquid chamber; and a liquid pressure fluctuator to be able to cause a pressure exerted on a liquid inside at least one of the first liquid channel or the second liquid channel to fluctuate, wherein the stirrer is to use the liquid pressure fluctuator to cause the pressure exerted on the liquid inside at least one of the first liquid channel or the second liquid channel to fluctuate.

16. The liquid discharge apparatus according to claim 1, further comprising:

a first pressurizer and a second pressurizer each to pressurize the liquid in the supplier; and a second valve in a liquid channel between the second pressurizer and the supplier and to be able to open and close the liquid channel, wherein a magnitude of a pressure applied by the first pressurizer differs from a magnitude of a pressure applied by the second pressurizer, and wherein the stirrer is to use the second valve to open and close the liquid channel between the second pressurizer and the supplier.

17. A coating apparatus comprising the liquid discharge apparatus of claim 1, wherein the coating apparatus applies the liquid discharged from the liquid discharge apparatus onto a substrate.

18. A liquid discharge method performed by a liquid discharge apparatus according to claim 1, comprising:

controlling, by control circuitry, movement of the first valve by the actuator, wherein the movement of the first valve includes a first movement in which a valve component is moved from a second position toward a first position and a second movement in which the valve component is reciprocated back and forth between the first position and a third position, and wherein the first position is a position where the discharge orifice is opened by the valve component, the second position is a position where the discharge orifice is closed by the valve component, and the third position is a position between the first position and the second position.

19. The liquid discharge method according to claim 18, wherein:

the liquid is one of a liquid whose viscosity is higher than 10 mPa·s, a liquid whose thixotropic index which indicates structural viscosity is higher than 1.3, a liquid whose solids content is higher than 20 wt %, or a liquid containing particles whose particle size is larger than 5 μm.

* * * * *